United States Patent [19]
Fujita et al.

[11] Patent Number: 5,879,438
[45] Date of Patent: Mar. 9, 1999

[54] METHOD FOR IMPROVING LIGHT-FASTNESS OF REVERSIBLE THERMOCHROMIC COMPOSITIONS AT THE TIME OF COLOR EXTINGUISHMENT

[75] Inventors: Katsuyuki Fujita, Bisai; Yoshiaki Ono, Gifu; Yutaka Shibahashi, Nagoya, all of Japan

[73] Assignee: The Pilot Ink Co., Ltd., Aichi-ken, Japan

[21] Appl. No.: 791,420

[22] Filed: Jan. 30, 1997

[30] Foreign Application Priority Data

Feb. 6, 1996 [JP] Japan .................................. 8-053588

[51] Int. Cl.$^6$ .................................................. C09D 11/02
[52] U.S. Cl. .......................................................... 106/31.18
[58] Field of Search .............................. 106/31.18, 31.17, 106/31.16

[56] References Cited

U.S. PATENT DOCUMENTS

| | | | |
|---|---|---|---|
| 4,028,118 | 6/1977 | Nakasuji et al. .......................... | 106/21 |
| 4,865,648 | 9/1989 | Kito et al. .............................. | 106/31.17 |
| 5,160,371 | 11/1992 | Ito ....................................... | 106/31.16 |
| 5,179,065 | 1/1993 | Ito ....................................... | 106/31.16 |
| 5,350,633 | 9/1994 | Sumi et al. ........................... | 106/31.17 |
| 5,558,699 | 9/1996 | Nakashima et al. ................. | 106/31.16 |

FOREIGN PATENT DOCUMENTS

| | | |
|---|---|---|
| 0659582 | 6/1995 | European Pat. Off. . |
| 2494707 | 5/1982 | France . |
| 2503729 | 10/1982 | France . |
| 2093055 | 8/1982 | United Kingdom . |
| 2100279 | 12/1982 | United Kingdom . |

*Primary Examiner*—Deborah Jones
*Attorney, Agent, or Firm*—Fitzpatrick, Cella, Harper & Scinto

[57] ABSTRACT

A reversible thermochromic composition is formed by blending: (a) an electron donating compound; (b) an electron accepting compound; (c) a metachromatic temperature adjuster; (d) an electron accepting, light-fastness providing agent represented by Formula I based on 1.0 part by weight of the component-(a) electron donating compound:

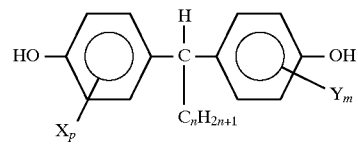

wherein n represents an integer of 5 to 17; X and Y each represent $C_{1-4}$ or halogen; and p and m each represent an integer of 0 to 3.

20 Claims, 9 Drawing Sheets

LIGHT-FASTNESS TEST, TYPE 1
COLORING DENSITY ATTENUATION
(CARBON ARC LAMP LIGHT)

LIGHT-FASTNESS TEST, TYPE 1
COLORING DENSITY ATTENUATION
(CARBON ARC LAMP LIGHT)

LIGHT-FASTNESS TEST, TYPE 1
COLORING DENSITY ATTENUATION
(CARBON ARC LAMP LIGHT)

LIGHT-FASTNESS TEST, TYPE 1
COLORING DENSITY ATTENUATION
(CARBON ARC LAMP LIGHT)

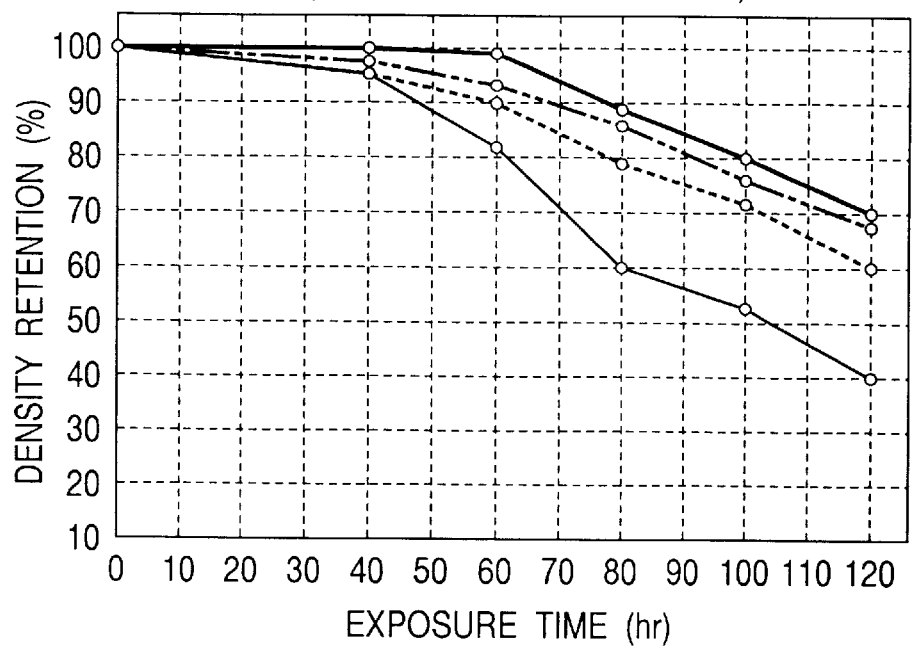
FIG. 5 LIGHT-FASTNESS TEST, TYPE 2
COLORING DENSITY ATTENUATION
(CARBON ARC LAMP LIGHT)
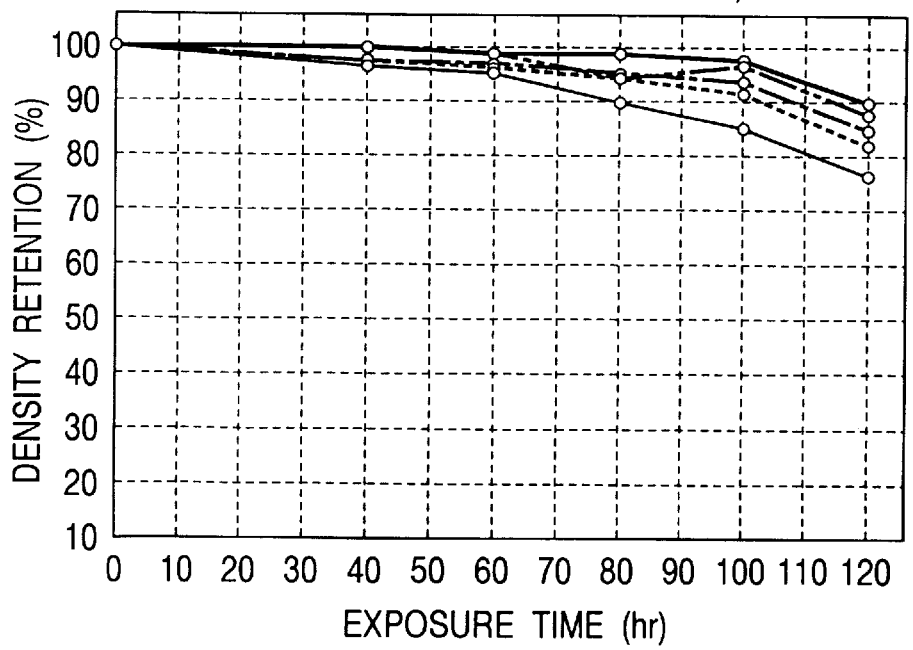
FIG. 6 LIGHT-FASTNESS TEST, TYPE 2
COLORING DENSITY ATTENUATION
(CARBON ARC LAMP LIGHT)

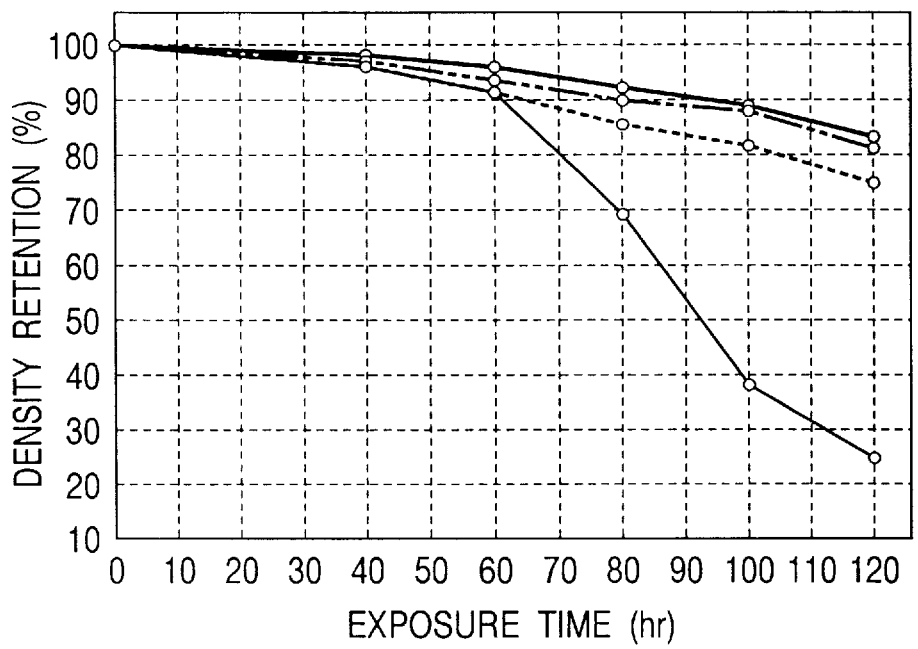
FIG. 7 LIGHT-FASTNESS TEST, TYPE 2 COLORING DENSITY ATTENUATION (CARBON ARC LAMP LIGHT)
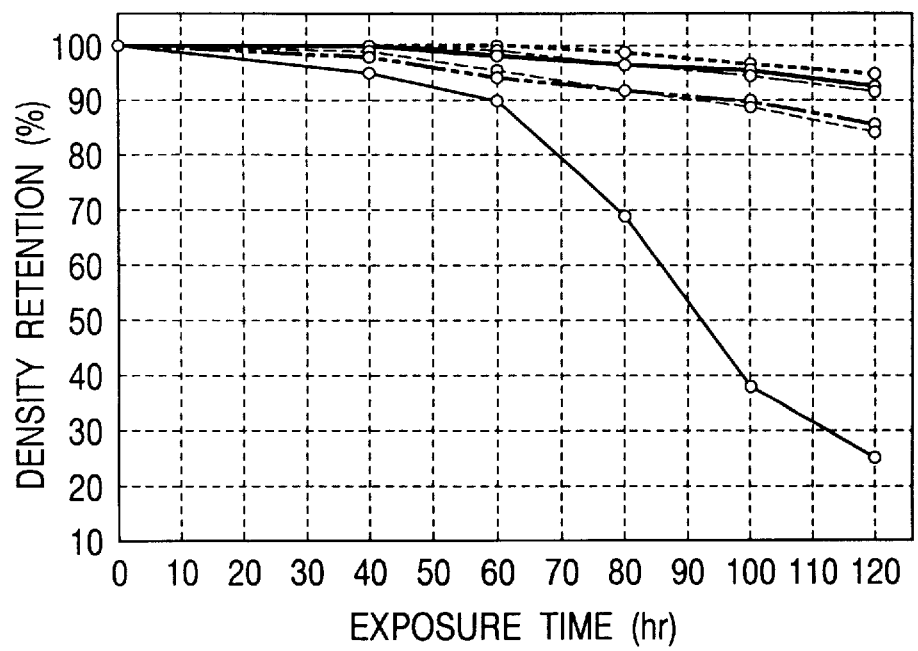
FIG. 8 LIGHT-FASTNESS TEST, TYPE 2 COLORING DENSITY ATTENUATION (CARBON ARC LAMP LIGHT)

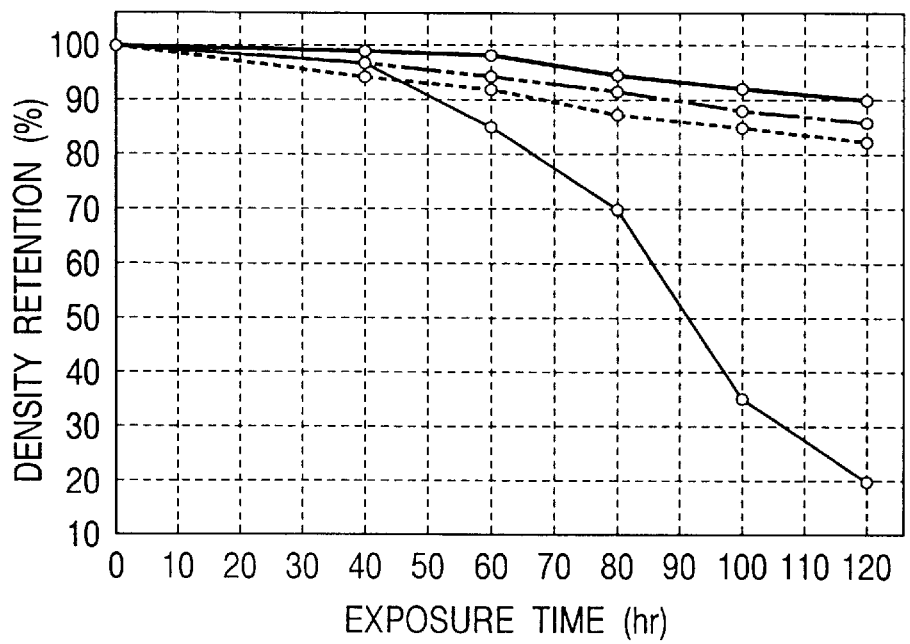
FIG. 9 LIGHT-FASTNESS TEST, TYPE 2
COLORING DENSITY ATTENUATION
(CARBON ARC LAMP LIGHT)
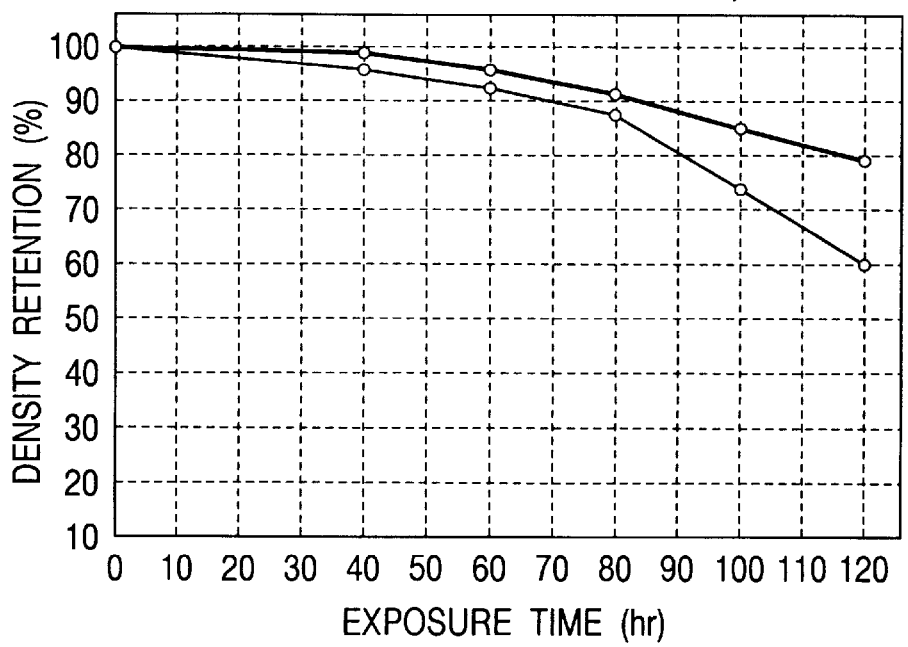
FIG. 10 LIGHT-FASTNESS TEST, TYPE 2
COLORING DENSITY ATTENUATION
(CARBON ARC LAMP LIGHT)

FIG. 11 LIGHT-FASTNESS TEST, TYPE 2
COLORING DENSITY ATTENUATION
(CARBON ARC LAMP LIGHT)
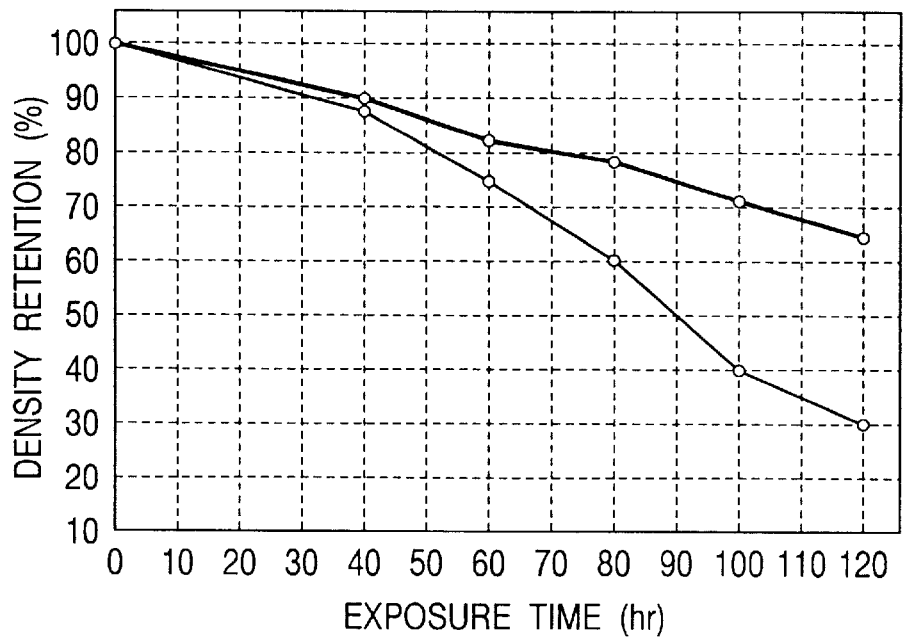
FIG. 12 LIGHT-FASTNESS TEST, TYPE 2
COLORING DENSITY ATTENUATION
(CARBON ARC LAMP LIGHT)
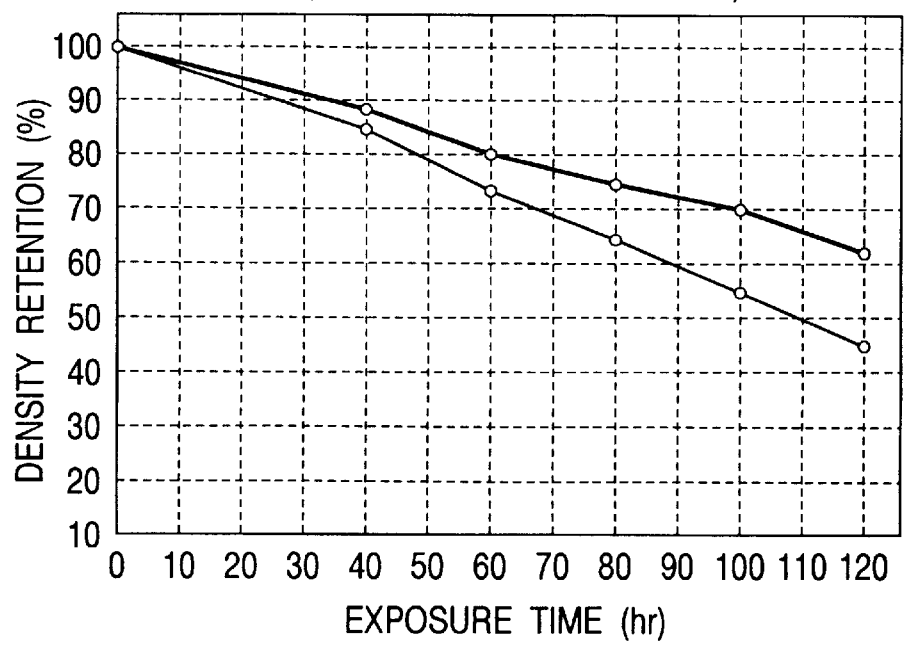

FIG. 13 LIGHT-FASTNESS TEST, TYPE 2
COLORING DENSITY ATTENUATION
(CARBON ARC LAMP LIGHT)
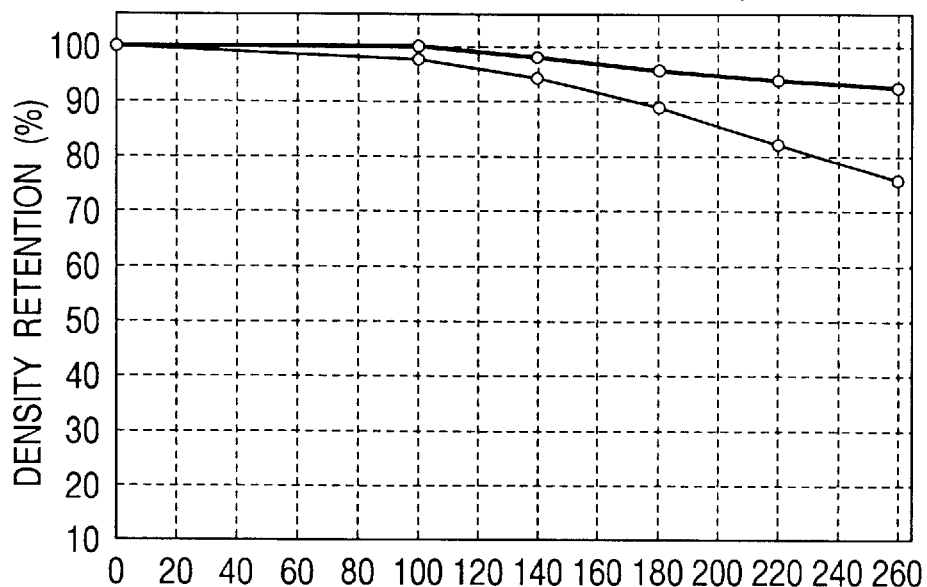
FIG. 14 LIGHT-FASTNESS TEST, TYPE 2
COLORING DENSITY ATTENUATION
(CARBON ARC LAMP LIGHT)
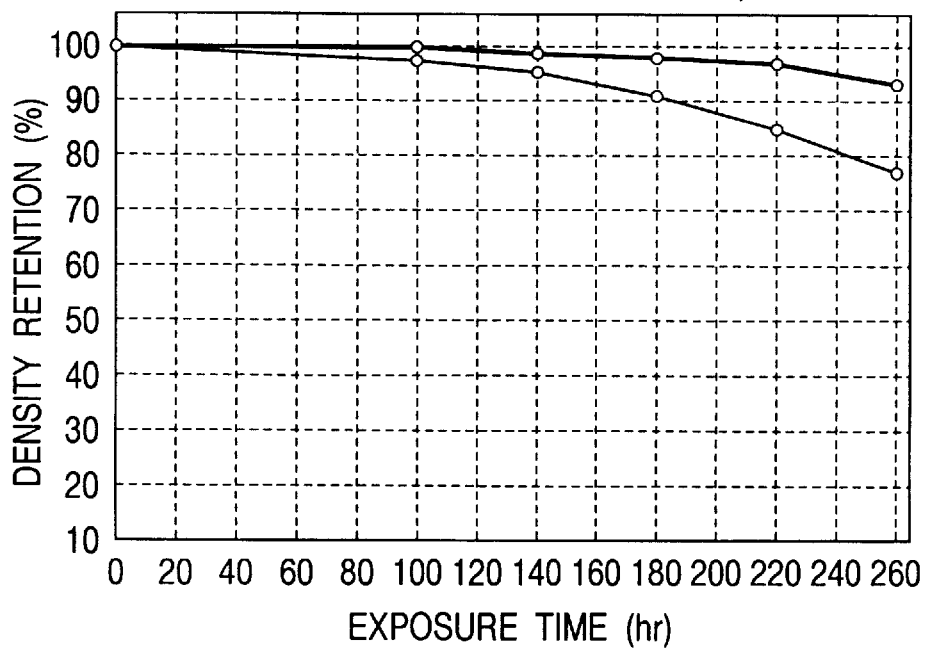

LIGHT-FASTNESS TEST, TYPE 2
COLORING DENSITY ATTENUATION
(CARBON ARC LAMP LIGHT)

LIGHT-FASTNESS TEST, TYPE 3
COLORING DENSITY ATTENUATION
(CARBON ARC LAMP LIGHT)

LIGHT-FASTNESS TEST, TYPE 3
COLORING DENSITY ATTENUATION
(CARBON ARC LAMP LIGHT)

LIGHT-FASTNESS TEST, TYPE 3
COLORING DENSITY ATTENUATION
(CARBON ARC LAMP LIGHT)

METHOD FOR IMPROVING LIGHT-FASTNESS OF REVERSIBLE THERMOCHROMIC COMPOSITIONS AT THE TIME OF COLOR EXTINGUISHMENT

BACKGROUND OF THE INVENTION

1. Field of the Invention

This invention relates to a method for improving the light-fastness (resistance of degradation of color to light) of reversible thermochromic compositions by use of a specific electron accepting light-fastness providing agent.

2. Description of the Related Art

Thermochromic compositions comprised of a combination of electron donating compounds with electron accepting compounds are known in the art, e.g., in U.S. Pat. No. 3,560,229. Since metachromatic temperatures of such compositions depend on the combination of the compounds used, it has been very difficult to obtain compositions capable of varying in color at the desired temperature.

The present inventors have invented a method in which a specific alcohol, ester or ketone is used as a metachromatic temperature adjuster to adjust the metachromatic temperature to the desired temperature (Japanese Patent Publications No. 51-44706, No. 51-44708, No. 52-7764 and No. 6-59746).

The invention previously made by the present inventors is important in that the metachromatic temperature can be controlled to any desired temperature even if the combination of an electron donating and electron accepting compounds is not varied.

However, the combination of these electron donating and electron accepting compounds has a disadvantage that the electron donating compound has poor light-fastness and hence any thermochromic compositions making use of it also have poor light-fastness. Accordingly, the color may become faded by light or, in an extreme instance, may become completely decolored.

SUMMARY OF THE INVENTION

The present invention was made in order to solve the problems involved in the prior art.

An object of the present invention is to provide a method for improving the light-fastness of a reversible thermochromic composition.

To achieve the above object, the present invention provides a metachromatic, or a reversible thermochromic composition comprising;

(a) an electron donating compound;

(b) an electron accepting compound; and (c) a metachromatic temperature adjuster;

wherein;

(d) 0.3–70 parts by weight of an electron accepting, light-fastness providing agent represented by Formula I based on 1.0 part by weight of the component -(a) electron donating compound:

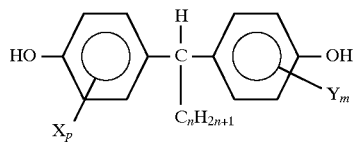

wherein n represents an integer of 5 to 17 to form a straight-chain or branched alkyl group; X and Y each represent a straight-chain or branched alkyl group having 1 to 4 carbon atoms, or a halogen atom; and p and m each represent an integer of 0 to 3; and (e) a light stabilizer.

In another embodiment of the present invention, a layer of at least one of an additional light stabilizer and a metallic luster pigment is formed on the surface of a layer of the reversible thermochromic composition described above.

The above and other objects, features and advantages of the present invention are described in or will become apparent from the following description of the preferred embodiments.

BRIEF DESCRIPTION OF THE DRAWINGS

FIGS. 1 to 18 are graphs showing coloring density attenuation in Examples of the present invention and Comparative Examples.

DESCRIPTION OF THE PREFERRED EMBODIMENTS

Figure 1:
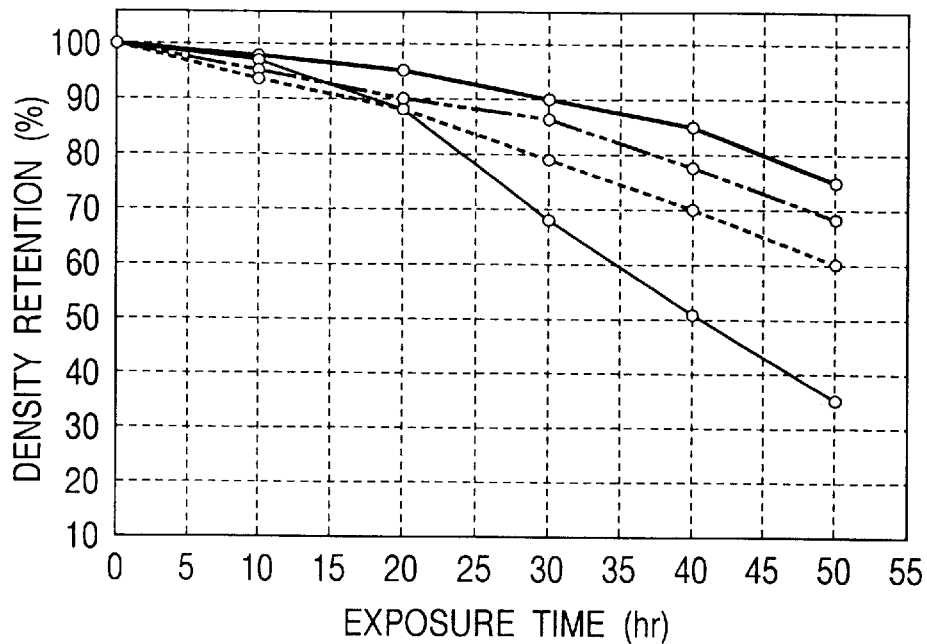

The present invention is a method of effecting metachromatism by the use of a reversible thermochromic composition comprising an electron donating compound [hereinafter often "component (a)"], an electron accepting compound [hereinafter often "component (b)"] and a metachromatic temperature adjuster [hereinafter often "component (c)"], and is characterized in that the composition is incorporated with a specific electron accepting light-fastness providing agent [hereinafter often "component (d)"] represented by the following Formula I, in an amount of from 0.3 part by weight to 70 parts by weight based on 1.0 part by weight of components (a), and a light stabilizer [hereinafter often "component (e)"].

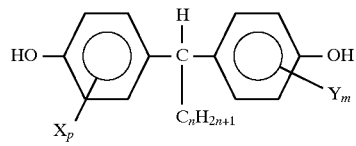

wherein n represents an integer of 5 to 17 to form a straight-chain or branched alkyl group; X and Y each represent a straight-chain or branched alkyl group having 1 to 4 carbon atoms, or a halogen atom; and p and m each represent an integer of 0 to 3.

The electron donating compound is typified by leuco dyes. The leuco dyes have a weak light-fastness and hence compositions making use of them readily age by exposure to light, thereby causing a deterioration of metachromatic properties.

The electron donating compound is affected by light when it is brought into an electron-donated state (in which the compound has donated an electron), i.e., in terms of the leuco dyes, when brought into a color-developed state.

On the other hand, when brought into a color-extinguished (or colorless) molecular state, the electron donating compound is also greatly affected by ultraviolet rays to cause deterioration of metachromatic properties. Since thermochromic compositions perform display by alternating color development and color extinguishment, light-fastness is also required at the time of color extinguishment.

Ultraviolet light absorbers, metallic luster pigments and so forth which are conventionally used to improve light-fastness are effective for screening ultraviolet rays, but not effective against visible light rays.

The present inventors have discussed that deterioration of reversible thermochromic properties occurs in the color-extinguished state even if ultraviolet rays are screened due to visible light rays which were previously considered not to affect the thermochromic properties.

Accordingly, the present invention also employs at least one of the light stabilizer and the metallic luster pigment [hereinafter often "component (f)"] to filter the ultraviolet rays that greatly affect the properties in the color-extinguished state, and employs the above compound of Formula I to prevent the properties from being affected by visible light rays. Thus, the present invention has succeeded in greatly improving the light-fastness of reversible thermochromic compositions.

At least one of the light stabilizer and the metallic luster pigment and the light-fastness providing agent represented by Formula I must be used in combination so that the light-fastness at the time of color extinguishment may be improved. In this regard, the present invention differs reversible thermochromic compositions which provide from improved light-fastness at the time of color development.

The color-developed state and color-extinguished state of the reversible thermochromic composition used in the present invention will be described below.

The components (a), (b) and (c) of the reversible thermochromic composition used in the present invention are molecular compounds and are not ionized compounds in the state they are actually handled. In the reversible thermochromic composition in which these components are uniformly mixed, the components (a) and (b) ionize and combine to come into the color-developed state at a temperature not higher than the metachromatic temperature. On the other hand, at a temperature not lower than the metachromatic temperature, the ionic bond between the components (a) and (b) disappears, and the components (a) and (b) become independent from each other to turn into molecular compounds and come into the color-extinguished state. The component-(b), which is a phenolic hydroxyl group, undergoes solvation upon its dissolution in the component-(c) metachromatic temperature adjuster to have a strong affinity for the component (c). (Of course, the component (a) is not found separately but is actually dissolved in the component (c) together with the component (d) or (b) in the reversible thermochromic composition, and hence has a weak mutual action on the component (a) and component (d) or (b) in the color- extinguished state.)

Actually, the component (d) more contributes to improving light-fastness than the component (b) in the color-extinguished state. From this fact, it is seen that the component (d) and the component (a) interact. In the transitional stage of metachromatism, the components (a) and (b) are presumed to come into a state intermediate between the ionized state and the molecular state and to stand in a weak ionic bond in the state they are ionized to a certain extent. The color development occurs even if components (a) and (b) only come into slightly ionized state. Thus, with regard to the light-fastness, the transitional state is regarded as the color-developed state.

Since thermochromic compositions cause metachromatism while repeating the color-extinguished state and the color-developed state, the reversible thermochromic properties may deteriorate unless the light-fastness in the both states is improved.

It is another feature of the present invention that the light-fastness providing agent represented by Formula I and at least one of the light stabilizer and the metallic luster pigment are used in combination to thereby make the composition free from being affected by either visible light rays or ultraviolet rays at the time of color extinguishment.

The component-(d) light-fastness providing agent used in the present invention has electron accepting properties and is utilized in an amount not less than 0.3 part by weight based on 1.0 part by weight of the electron donating compound (a). If the light-fastness providing agent is present in an amount less than 0.3 part by weight based on 1.0 part by weight of the electron donating compound (a) no sufficient light-fastness can be obtained when the reversible thermochromic composition is in the color- extinguished state.

The component-(d) light-fastness providing agent represented by Formula I, used in the present invention, is a bisphenol compound or bis(hydroxyphenyl) compound comprising an alkyl group to which two phenyl rings each having a hydroxyl group is attached through the terminal carbon atom. This compound is characterized in that the alkyl group except the terminal carbon atom has 5 to 17 carbon atoms (n). If the number of carbon atoms is less than 5, the alkyl group is so short that the solubility in the aromatic component-(c) metachromatic temperature adjuster may be insufficient and a well stabilized structure can not be obtained in the solid atmosphere having a temperature not higher than the metachromatic temperature. If on the other hand the number of carbon atoms is more than 17, the alkyl group is so excessively long that the solubility in the aromatic component-(c) metachromatic temperature adjuster may be excessive and the resulting composition may not be practical because it has a weak color forming power and also a poor metachromatic sensitivity.

It is most preferable for the alkyl group to be a straight-chain alkyl group. In the case when the alkyl group is branched, the branch is preferably be as short as possible.

Each of the phenyl rings, a straight-chain or branched alkyl group or a halogen may be attached as a substitute.

It is still another feature of the present invention that the compound of Formula I is used in an amount of from 0.3 part by weight to 70 parts by weight based on 1.0 part by weight of the electron donating compound. If the compound of Formula I is added in an amount less than 0.3 part by weight, its addition can not be effective, and if added in an amount more than 70 parts by weight, its effect is no longer improved. The compound is preferably used in an amount of from 2.0 to 50 parts by weight.

Since this component-(d) light-fastness providing agent used in the present invention also has electron accepting properties, its use enables altering the amount of the component-(b) electron accepting compound to be used, or in some cases, complete substitution of component-(b) by component-(d).

When the component-(b) light-fastness providing agent represented by Formula I is replaced with the component-(d) electron accepting compound, it must be used in an amount of from 1.0 part by weight to 60 parts by weight based on 1.0 part by weight of the component-(a) electron donating compound. This is because compound (d) commonly has a larger molecular weight than compound (b) because of the former's long-chain alkyl group. Thus, the equivalent weight of the phenolic hydroxyl group (molecular weight/ the number of phenolic hydroxyl group per molecule) reacting with the component-(a) electron donating compound is larger than the component-(b) electron accepting compound, and hence the component (d) must be used in an amount larger than the case when the component (b) is used as the electron accepting compound. The component-(d) light-fastness providing agent may particularly preferably be used in an amount of from 2.0 to 50 parts by weight.

When the reversible thermochromic composition is in the color-extinguished state, the component-(a) electron donating, color forming organic compound has a weak interaction with the component-(d) light-fastness providing agent while remaining dissolved in the component-(c) metachromatic temperature adjuster; its stability in the component-(c) metachromatic temperature adjuster is improved by the long-chain alkyl group.

The extent to which the composition is made stable to light is not so great as the color-developed state where the component-(a) electron donating, color forming organic compound and the component-(d) light-fastness providing agent have ionically strongly interacted. It is believed that such weak interaction prohibits photo-oxidation and photo-decomposition from being caused by light also when the composition is in the color-extinguished state, to bring about an improvement in light-fastness.

In addition, ultraviolet rays, chiefly causative of deterioration in the color-extinguished state, are screened by the component-(e), so that the light-fastness can be more effectively improved. Ultraviolet rays are screened more effectively when a layer formed of the component- (f) at least one of the light stabilizer and the metallic luster pigment is formed on the surface of a layer formed of the reversible thermochromic composition.

The weak interaction between the component-(a) electron donating, color forming organic compound and the component-(d) light-fastness providing agent in the color-extinguished state is believed to be attributable to an electrostatic force acting between the component-(a) electron donating, color forming organic compound having an amino group, a carbonyl group, etc. and the molecule having a polar structure because of a substituent having a great polarity as in the component-(d) having a phenolic hydroxyl group.

The component-(b) electron accepting compound includes compounds having active protons, pseudo acid compounds (e.g., compounds capable of acting as acids in the composition to make the component (a) form color), and compounds having electron holes.

Of the compounds having active protons, a compound having a phenolic hydroxyl group exhibits the most effective thermochromic properties, and may be a compound selected from aromatic carboxylic acids, aliphatic carboxylic acids having 2 to 5 carbon atoms, carboxylic acid metal salts, acid phosphates and metal salts thereof, 1,2,3-triazole and derivatives thereof, thiourea and derivatives thereof, urea and derivatives thereof, guanidine and derivatives thereof, aromatic or aliphatic carboxylic acid anhydrides, borates, halogenated alcohols, oxazoles, thiazoles, imidazoles, pyrazoles, pyrroles, aromatic sulfonamides and aromatic sulfonimides.

Since the component-(d) light-fastness providing agent represented by Formula I has electron accepting properties by itself, it is preferable to control the amount of the component-(b) electron accepting compound by the component-(d) light- fastness providing agent.

The component-(a) electron donating, color forming organic compound used in the present invention is exemplified in Table 1.

TABLE 1

Compound groups, and exemplary compounds thereof

Diphenylmethanephthalides:

3,3-Bis(p-dimethylaminophenyl)-6-dimethylaminophthalide,
3,3-bis(p-dimethylaminophenyl)phthalide, etc.

Phenylindolylphthalides:

3-(4-Diethylaminophenyl)-3-(1-ethyl-2-methylindol-3-yl)phthalide,
3-(2-methyl-4-diethylamino)phenyl-3-[1-(2-methoxyethyl)-2-methylindol-3-yl)phthalide, etc.

Indolylphthalides:

3-3-Bis(1-n-butyl-2-methylindol-3-yl)phthalide,
3-3-bis(1-ethyl-2-methylindol-3-yl)phthalide,
3-3-bis(1-n-pentyl-2-methylindol-3-yl)phthalide,
3-(1-n-butyl-2-methylindol-3-yl)-3-(1-n-octyl-2-methylindol-3-yl)phthalide, etc.

Diphenylmethaneazaphthalides:

3,3-Bis(2-ethoxy-4-diethylaminophenyl)-4-azaphthalide,

Phenylindolylazaphthalides:

3-(2-Ethoxy-4-diethylaminophenyl)-3-(1-ethyl-2-methylindol-3-yl)-4-azaphthalide,
3-(4-diethylamino-2-methylphenyl)-3-(1-ethyl-2-methylindol-3-yl)-4-azaphthalide,
3-(2-ethoxy-4-N-ethylanilino)-3-(1-ethyl-2-methylindol-3-yl)-4-azaphthalide,
3-[2-ethoxy-4-(N-ethyl-4-n-butylphenylamino)phenyl]-3-(1-ethyl-2-methylindol-3-yl)-7-azaphthalide, etc.

Fluorans:

3,6-Dimethoxyfluoran,
3,6-di-n-butoxyfluoran,
2-chloro-6-diethylaminofluoran,
2-methyl-6-diethylaminofluoran,
2-methyl-6-(N-ethyl-N-p-tolylamino)fluoran,
3-chloro-6-cyclohexylaminofluoran,
2-methyl-6-cyclohexylaminofluoran,
2-anilino-6-(N-ethyl-N-n-hexylamino)fluoran,
2-(2-chloroanilino)-6-diethylaminofluoran,
2-(2-chloroanilino)-6-di-n-butylaminofluoran,
2-(3-trifluoromethylanilino)-6-diethylaminofluoran,
2-(N-cyclohexyl-N-benzylamino)-6-diethylaminofluoran,
2-N,N-dibenzylamino-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-chloro-3-methyl-6-(4-di-n-butylanilino)fluoran,
2-n-octylamino-3-methyl-6-diethylaminofluoran,
2-N,N-dibenzylamino-3-methyl-6-diethylaminofluoran,
2-N,N-dibenzylamino-4-methyl-6-diethylaminofluoran,
2-anilino-3-methyl-6-(N-methyl-N-n-propylamino)fluoran,
2-anilino-3-methyl-6-diethylaminofluoran,
2-anilino-3-methyl-6-(N-ethyl-N-isobutylamino)fluoran,
2-anilino-3-methyl-6-di-n-butylaminofluoran,
2-anilino-3-methyl-6-(N-ethyl-N-isopentylamino)fluoran,
2-anilino-3-methyl-6-di-n-pentylaminofluoran,
2-anilino-3-methyl-6-(N-ethyl-N-cyclohexylamino)fluoran,
2-anilino-3-methyl-6-(N-ethyl-N-p-tolylamino)fluoran,
2-(2-fluoroanilino)-6-di-n-butylaminofluoran,
2-xylidino-3-methyl-6-diethylaminofluoran,
2-(p-n-butylanilino)-3-methyl-6-diethylaminofluoran, TABLE 1-continued Compound groups, and exemplary compounds thereof 1,2-benzo-6-diethylaminofluoran,
1,2-benzo-6-(N-ethyl-N-isobutylamino)fluoran,
1,2-benzo-6-(N-ethyl-N-isoamylamino)fluoran,
1,2-benzo-6-di-n-butylaminofluoran, etc.,
Styrylquinones:

2-(3-Methoxy-4-dodecoxystyryl)quinoline, etc.
Pyridines:

4-(4-N-methyl-N-benzylaminophenyl)pyridine,
2,6-diphenyl-4-(4-dimethylaminophenyl)pyridine,
2,6-bis(4-methoxyphenyl)-4-(4-dimethylaminophenyl)pyridine,
2,6-dimethyl-3,5-biscarboxyethoxy-4-(4-dimethylaminophenyl)pyridine,
2-(2-octoxyphenyl)-4-(4-dimethylaminophenyl)-6-phenylpyridine,
2,6-diethoxy-4-(4-diethylaminophenyl)pyridine,
2,6-bis(4-n-butoxyphenyl)-4-(4-dimethylamino-phenyl)pyridine,
2,6-bis(2-n-butoxyphenyl)-4-(4-dimethylamino-phenyl)pyridine,
2,6-bis(2-ethoxyphenyl)-4-(4-dimethylamino-phenyl)pyridine,
2,6-bis(2-ethoxyphenyl)-4-(4-diethylamino-phenyl)pyridine, etc.
Quinazolines:

2-(4-Dimethylaminophenyl)-4-methoxyquinazoline,
2-(4-dimethylaminophenyl)-4-phenoxyquinazoline,
2-(4-dimethylaminophenyl)-4-(4-nitrophenyloxy)-quinazoline,
2-(4-N-methylanilinophenyl)-4-phenoxyquinazoline,
2-(4-piperidinophenyl)-4-phenoxyquinazoline,
2-(4-dimethylaminophenyl)-4-(4-chlorophenyloxy)quinazoline,
2-(4-dimethylaminophenyl)-4-(4-methoxyphenyloxy)quinazoline, etc.
Bisquinazolines:

4,4'-(Ethylenedioxy)-bis[2-(4-diethylamino-phenyl)quinazoline],
4,4'-[propylenedioxy(1,3)])-bis[2-(4-diethylamino-phenyl)quinazoline],
4,4'-[butylenedioxy(1,3)])-bis[2-(4-diethylamino-phenyl)quinazoline],
4,4'-[butylenedioxy(1,4)])-bis[2-(4-diethylamino-phenyl)quinazoline],
4,4'-(oxydiethylenedioxy)-bis[2-(4-diethylamino-phenyl)quinazoline],
4,4'-(ethylenedioxy)-bis[2-(4-piperidino-phenyl)quinazoline],
4,4'-(ethylenedioxy)-bis[2-(4-di-n-propylamino-phenyl)quinazoline],
4,4'-(ethylenedioxy)-bis[2-(4-di-n-butylamino-phenyl)quinazoline],
4,4'-(cyclohexylenedioxy)-bis[2-(4-diethylamino-phenyl)quinazoline], etc.
Ethylenophthalides:

3-3-Bis[1,1-bis-(p-dimethylaminophenyl)ethyleno-2]phthalide,
3-3-bis[1,1-bis-(2-methyl-4-dimethylamino-phenyl)ethyleno-2]phthalide,
3-3-bis[1,1-bis-(p-dimethylaminophenyl)ethyleno-2]-4,5,6,7-tetrachlorophthalide, etc.
Ethylenoazaphthalides:

3-3-Bis[1,1-bis-(p-dimethylaminophenyl)ethyleno-2]-4-azaphthalide,
3-3-bis[1,1-bis-(p-dimethylaminophenyl)ethyleno-2]-4,7-diazaphthalide,
3-(p-dimethylaminophenyl)-3-[1,1-bis-(p-dimethylaminophenyl)ethyleno-2]-4-azaphthalide, etc.

TABLE 1-continued

Compound groups, and exemplary compounds thereof

Fluorenes:

3,6-Bis(dimethylamino)fluorenespiro(9.3')-6'-dimethylaminophthalide,
3,6-bis(diethylamino)fluorenespiro(9.3)-4'-azaphthalide,
3,6-bis(diethylamino)fluorenespiro(9.3')-7'-azaphthalide,
3,6-bis(diethylamino)fluorenespiro(9.3')-4',7'-diazaphthalide, etc.

The component-(b) electron accepting compound used in the present invention is exemplified in Table 2 below.

TABLE 2

Compound groups, and exemplary compounds thereof

Compounds having phenolic hydroxyl groups:

(Including monophenols to polyphenols; those having as
a substituent thereof an alkyl group, an aryl group,
an acyl group, an alkoxycarbonyl group, a carboxyl
group, esters thereof, or an amide group or a halogen
atom; bis-type or tris-type phenols; and phenol-
aldehyde condensation resins. They may also be metals
salts of these compounds having phenolic hydroxyl
groups.)
Phenol, o-cresol, tertiary butyl catechol, 3-
isopropyl catechol, p-chlorophenol, p-
bromophenol, o-phenylphenol,
methyl p-hydroxybenzoate,
ethyl p-hydroxybenzoate,
propyl p-hydroxybenzoate,
n-butyl p-hydroxybenzoate,
resorsinol, α-naphthol, β-naphthol,
1,2-dioxynaphthalene,
2,3-dioxynaphthalene,
hydroquinone monomethyl ether,
guaiacol, eugenol,
methyl protocatechuate, ethyl protocatechuate,
propyl protocatechuate,
methyl gallate, ethyl gallate, butyl gallate,
tannic acid,
4,4'-methylene bisphenol,
bis-(3-methyl-4-hydroxyphenyl)-methane,
1,1-bis-(4-hydroxyphenyl)-ethane,
1,1-bis-(4-hydroxyphenyl)-propane,
1,1-bis-(3-methyl-4-hydroxyphenyl)-propane,
1,1-bis-(3-isopropyl-4-hydroxyphenyl)-propane,
1,1-bis-(4-hydroxyphenyl)-butane,
1,1-bis-(4-hydroxyphenyl)-2-methylpropane,
2,2-bis-(4-hydroxyphenyl)-propane,
2,2-bis-(3-methyl-4-hydroxyphenyl)-propane,
2,2-bis-(4-hydroxyphenyl)-butane,
4,4',4"-methylidenetrisphenol,
4,4-dihydroxydiphenyl sulfone,
4-isopropoxy-4'-hydroxydiphenyl sulfone,
bis(4-hydroxydiphenyl) sulfide, phenol resin,
etc.
Metal salts:

Metal salts of metals such as sodium, potassium,
lithium, calcium, zinc, zirconium, aluminum,
magnesium, nickel, cobalt, tin, copper, iron,
vanadium, titanium, lead and molybdenum.
Aromatic carboxylic acids, and aliphatic carboxylic
acids having 2 to 5 carbon atoms:

Maleic acid, fumaric acid, benzoic acid, toluic
acid, p-tert-butylbenzoic acid, chlorobenzoic
acid, bromobenzoic acid, ethoxybenzoic acid,
gallic acid, naphthoic acid, phthalic acid,
naphthalene dicarboxylic acid, acetic acid, TABLE 2-continued Compound groups, and exemplary compounds thereof propionic acid, butyric acid, valeric acid,
etc.
Carboxylic acid metal salts:

Metals salts of metals such as sodium, potassium,
lithium, calcium, zinc, zirconium, aluminum,
magnesium, nickel, cobalt, tin, copper, iron, vanadium,
titanium, lead and molybdenum, of acetic acid,
propionic acid, butyric acid,
caproic acid, caprylic acid, capric acid, lauric
acid, myristic acid, palmitic acid, stearic
acid, isostearic acid, behenic acid, crotonic
acid, oleic acid, elaidic acid, linolic acid,
linolenic acid, monochloroacetic acid,
monobromoacetic acid, monofluorooacetic acid,
glycolic acid, hydroxypropionic acid, hydroxybutyric
acid, ricinolic acid, 1,2-hydroxystearic acid, lactic
acid, pyruvic acid, oxalic acid, malonic acid, succinic
acid, adipic acid, sebacic acid, malic acid, tartaric
acid, valeric acid, maleic acid, fumaric acid,
naphthenic acid, benzoic acid, toluic acid,
phenylacetic acid, p-tert- butylbenzoic acid, cinnamic
acid, chlorobenzoic acid, bromobenzoic acid,
ethoxybenzoic acid, mandelic acid, protocatechuic acid,
vanillic acid, resorcic acid, dioxybenzoic acid,
dioxychlorobenzoic acid,
gallic acid, naphthoic acid, hydroxynaphthoic
acid, phthalic acid, monoethyl phthalate, naphthalene
dicarboxylic acid, naphthalene monomethyldicarboxylic
acid, trimellitic acid, pyromellitic acid, etc.
Acid phosphates:

(Acid phosphate compounds include monoesters and
diestrers, and may be mixtures thereof. Mixtures of
monoesters and diestrers are called acid phosphates.)
n-Butyl acid phosphate,
n-ethylhexyl acid phosphate,
n-octyl acid phosphate,
oleyl acid phosphate,
2-chloroethyl acid phosphate,
cyclohexyl acid phosphate,
phenyl acid phosphate,
diethyl phosphate,
phenyl methyl phosphate,
cyclohexylstearyl phosphate,
dibenzyl phosphate, etc.
Metal salts of acid phosphates:

Metals salts of metals such as sodium, potassium,
lithium, calcium, zinc, zirconium, aluminum,
magnesium, nickel, cobalt, tin, copper, iron,
vanadium, titanium, lead and molybdenum, of the
above compounds.
Triazole compounds:

1,2,3-Triazole,
1,2,3-benzotriazole,
5-chloro-1,2,3-benzotriazole, etc.
Thiourea and derivatives thereof:

Thiourea, ethylthiourea, N,N-diethylthiourea, 1-
phenylthiourea, diphenyl-bis-thiourea, etc.
Urea and derivatives thereof:

Urea, 1,3-diphenylurea, benzylurea, N,N-
dichlorohexylurea, etc.
Guanidine and derivatives thereof:

Guanidine, 1,3-diphenylguanidine, etc.
Aromatic and aliphatic carboxylic acid anhydrides:

Phthalic anhydride, benzoic anhydride, acetic
anhydride, succinic anhydride, maleic anhydride,
etc.
Borates:

Triphenyl borate, tri-n-octyl borate, etc.

TABLE 2-continued

Compound groups, and exemplary compounds thereof

Halogenated alcohols:

2,2,2-Trichloroethanol,
1,1,1-tribromo-2-propanol, etc.
Oxazoles:

2-Mercaptobenzoxazole, 2-hydroxybenzoxazole, etc.
Thiazoles:

Benzothiazole, 2-mercaptobenzothiazole, etc.
Imidazoles:

Imidazole, benzoimidazole, etc.
Pyrazoles:

Pyrazole, benzopyrazole, etc.
Pyrroles:

Pyrrole, benzopyrrole, etc.
Aromatic sulfonamides:

Benzenesulfonamide, benzenesulfonanilide, etc.
Aromatic sulfonimides:

D-sulfobenzimide,
1,2-cyclohexanesulfocarboxyimide, etc.

The component-(c) metachromatic temperature adjuster used in the present invention is exemplified in Table 3 below.

TABLE 3

Compound groups, and exemplary compounds thereof

Alcohols:

(Aliphatic monohydric saturated alcohols having 10 or
more carbon atoms)
Decyl alcohol, undecyl alcohol, dodecyl alcohol,
tridecyl alcohol, tetradecyl alcohol (Example:
myristyl alcohol), pentadecyl alcohol, hexadecyl
alcohol, heptadecyl alcohol, octadecyl alcohol
(Example: stearyl alcohol), eicosyl alcohol,
docosyl alcohol, etc.
Esters 1:

(Esters having 10 or more carbon atoms are effective,
including esters obtained from any desired combination
of monobasic carboxylic acids having an aliphatic
group and an alicyclic or aromatic ring with
monohydric alcohols having an aliphatic group and an
alicyclic or aromatic ring; esters obtained from any
desired combination of polybasic carboxylic acids
having an aliphatic group and an alicyclic or aromatic
ring with monohydric alcohols having an aliphatic
group and an alicyclic or aromatic ring; and esters
obtained from any desired combination of monobasic
carboxylic acids having an aliphatic group and an
alicyclic or aromatic ring with polyhydric alcohols
having an aliphatic and an alicyclic or aromatic
ring.)
Ethyl caprylate, octyl caprylate, stearyl
caprylate,
myristyl caprate, docosyl caprate, cetyl caprate,
stearyl caprate,
2-ethylhexyl laurate, n-decyl laurate,
3-methylbutyl myristate, cetyl myristate, stearyl
myristate,
isopropyl palmitate, neopentyl palmitate, nonyl
palmitate, stearyl palmitate, cyclohexyl
palmitate,
n-butyl stearate, n-methylbutyl stearate, 3,5,5-
trimethylhexyl stearate, n-undecyl stearate,
pentadecyl stearate, stearyl stearate,
cyclohexylmethyl stearate,

TABLE 3-continued

Compound groups, and exemplary compounds thereof isopropyl behenate, hexyl behenate, lauryl behenate, behenyl behenate,
cetyl benzoate, stearyl p-tert-butyl benzoate,
dimyristyl phthalate, distearyl phthalate,
dimyristyl oxalate, dicetyl oxalate,
dicetyl malonate, dilauryl succinate, dilauryl glutarate, diundecyl adipate, dilauryl azelate, di-(n-nonyl) sebacate,
dineopentyl 1,18-octadecylmethylenedicarboxylate,
ethylene glycol dimyristate,
propylene glycol dillaurate,
propylene glycol distearate,
hexylene glycol palmitate,
1,5-pentanediol distearate,
1,2,6-hexanetriol trimyristate,
1,4-cyclohexanediol didecyl,
1,4-cyclohexanedimethanol dimyristate,
xylene glycol dicaprinate,
xylene glycol distearate, etc.

Esters 2:

(Esters of saturated fatty acids with branched aliphatic alcohols, and esters of unsaturated fatty acids or saturated fatty acids having a branch or substituent with aliphatic alcohols branched or having 16 or more carbon atoms are also effective.)
2-Ethylhexyl butyrate,
2-methylbutyl caproate, 1-ethylpentyl caproate, 2-methylpentyl caproate,
2-methylbutyl caprylate, 2-methylpentyl caprylate,
2-methylbutyl caprate, 2-ethylhexyl caprate, 1-methylpentyl caprate, 2-methylpentyl caprate,
1,1-dimethylpropyl laurate, 2-methylpentyl laurate, 1-ethylhexyl laurate, 3,5,5-trimethylhexyl laurate, 3,7-dimethyloctyl laurate,
1-ethylhexyl myristate, 2-ethylhexyl myristate, 3,7-dimethylhexyloctyl myristate,
1-ethylpropyl palmitate, 1-ethylpentyl palmitate, 2-methylhexyl palmitate, 1-ethylhexyl palmitate, 3,5,5-trimethylhexyl palmitate, 3,7-dimethyloctyl palmitate,
1-methylpropyl stearate, 1-ethylpropyl stearate, 2-methylbutyl stearate, 3-methylbutyl stearate, neopentyl stearate, 1-methylhexyl stearate, 2-methylhexyl stearate, 3,5,5-trimethylhexyl stearate, 1-methylheptyl stearate, 1-methyloctyl stearate, 3,7-dimethyloctyl stearate,
1-ethylpropyl behenate, 2-methylbutyl behenate, 3-methylbutyl behenate, 2-methylhexyl behenate, 2-ethylhexyl behenate, 1-methylheptyl behenate, 3,7-dimethyloctyl behenate,
stearyl oleate, behenyl oleate,
stearyl linolate, behenyl linolate,
3,7-dimethyloctyl erucate, stearyl erucate,
isostearyl erucate,
cetyl isostearate, stearyl isostearate,
2-methylpentyl 12-hydroxycisstearate,
2-ethylhexyl 18-bromostearate,
isostearyl 2-ketomyristate,
2-ethylhexyl 2-fluoromyristate, etc.

Esters 3:

[Among the foregoing esters, use of esters having a ΔT value (melting point - claud point) of 3° C. or below as disclosed in Japanese Patent Publication No. 1-2398 enable small hysteresis characteristic (hysteresis width: 0.5 to 2.0) in regard to the color density-temperature curve and to exhibition of a highly sensitive thermochromic responsive.
The esters having the width of ΔT of 3° C. or below include alkyl esters, aryl esters, arylalkyl esters, alicyclic esters, branched alkyl esters of aromatic or aliphatic carboxylic acids, and substituted derivatives thereof.]
Cetyl butyrate, stearyl butyrate, behenyl butyrate,
2-methylbutyl caproate, 2-methylpentyl caproate, 1-ethylpentyl caproate,
2-methylbutyl caprylate, 2-methylpentyl caprylate,
2-methylbutyl caprate, 1-methylpentyl caprate, 2-methylpentyl caprate, 2-ethylhexyl caprate,
1,1-dimethylpropyl laurate, 2-methylpentyl laurate, 1-ethylhexyl laurate, 3,5,5-trimethylhexyl laurate, 3,7-dimethyloctyl laurate,
1-ethylhexyl myristate, 2-ethylhexyl myristate, 3,5,5-trimethylhexyl myristate, 3,7-dimethyloctyl myristate,
n-butyl palmitate, 1-ethylpropyl palmitate, 1-ethylpentyl palmitate, 1-ethylhexyl palmitate, 3,5,5-trimethylhexyl palmitate, 3,7-dimethyloctyl palmitate,
1-methylpropyl stearate, 1-ethylpentyl stearate, n-butyl stearate, 3-methylbutyl stearate, n-hexyl stearate, 1-methylhexyl stearate, 2-methylhexyl stearate, 1-methylheptyl stearate, 1-methyloctyl stearate, 3,7-dimethyloctyl stearate, lauryl stearate,
n-butyl arachate,
n-butyl behenate, 1-ethylpropyl behenate, 3-methylbutyl behenate, 2-methylhexyl behenate, 2-ethylhexyl behenate, 1-methylheptyl behenate, 3,7-dimethyloctyl behenate,
n-butyl erucate, 3,7-dimethyloctyl erucate,
isostearyl erucate,
stearyl isostearate, cetyl isostearate,
2-methylpentyl 12-hydroxystearate,
2-ethylhexyl 18-bromostearate,
isostearyl 2-ketomyristate,
2-ethylhexyl 2-fluoromyristate,
stearyl oleate, behenyl oleate,
stearyl linorate, behenyl linorate, etc.

Esters 4:

[Esters having a ΔT value (melting point - claud point) of 5° C. to 50° C. are disclosed in Japanese Patent Publication No. 4-17154 and are effective to impart color-memorizing thermochromic properties exhibiting large hysteresis characteristics (e.g., where the shapes of the curves formed by plotting changes in coloring density caused by changes in temperature are different between the case when temperatures are changed from the low-temperature side to the high-temperature side and vice versa, and show a loop when both the curves are combined) in regard to the color density-temperature curve].

Compound Group (1)

Carboxylates containing a substituted aromatic group in the molecule:
Stearyl 2-methyl benzoate,
cetyl 4-tert-butyl benzoate,
behenyl 4-cyclohexyl benzoate,
myristyl 4-phenyl benzoate,
lauryl 4-octyl benzoate,
hexyl 3,5-dimethyl benzoate,
stearyl 3-ethyl benzoate,
decyl 4-isopropyl benzoate,
stearyl 4-benzoyl benzoate,
phenyl 4-tert-butyl benzoate,
4-chlorobenzyl 2-methyl benzoate,
stearyl 4-chlorobenzoate,
myristyl 3-bromobenzoate,
stearyl 2-chloro-4-bromobenzoate,
decyl 3,4-dichlorobenzoate,
octyl 2,4-dibromobenzoate,
cetyl 3-nitrobenzoate,
cyclohexylmethyl 4-aminobenzoate,
cetyl 4-diethylaminobenzoate,
stearyl 4-anilinobenzoate,
decyl 4-methoxybenzoate,

TABLE 3-continued

Compound groups, and exemplary compounds thereof cetyl 4-methoxybenzoate,
octyl 4-butoxybenzoate,
cetyl 4-hydroxybenzoate,
4-methoxyphenylmethyl benzoate,
stearyl p-chlorophenyl acetate,
cetyl p-chlorophenyl acetate,
benzyl salicylate,
neopentyl salicylate,
4-methoxymethylphenymethyl salicylate,
4-chlorophenylmethyl benzoate,
4-chlorophenylmethyl caprate,
4-methoxyphenylmethyl myristate,
4-methylphenylmethyl stearate,
4-nitrophenylmethyl stearate,
4-methylphenylmethyl caproate,
4-chlorophenylmethyl myristate,
4-methylphenylmethyl caprate,
4-chlorophenylmethyl 11-bromolaurate,
4-isopropylphenyl stearate, etc.
Compound Group (2)

Esters of carboxylic acids containing an unsubstituted aromatic group with aliphatic alcohols having 10 or more carbon atoms:
Stearyl 1-naphthoate,
cetyl benzilate,
stearyl benzilate,
decyl 3-benzoyl propionate,
stearyl benzoate,
cetyl benzoate,
myristyl benzoate, etc.
Compound Group (3)

Carboxylates containing a cycloalkyl group in the molecule:
Cyclohexylmethyl cinnamate,
cyclohexyl laurate,
cyclohexyl myristate,
cyclohexyl palmitate,
cyclohexylmethyl stearate,
cyclohexylethyl stearate,
stearyl cyclohexylethyl acetate,
stearyl 2-cyclohexyl propionate,
stearyl 2-cyclohexane carboxylate,
cyclohexyl 2-penzoyl propionate, etc.
Compound Group (4)

Esters of fatty acids having 6 or more carbon atoms with unsubstituted aromatic alcohols or phenols:
Benzyl caproate,
benzyl palmitate,
3-phenylpropyl stearate,
phenyl 11-bromolaurate, etc.
Compound Group (5)

Esters of fatty acids having 8 or more carbon atoms with branched aliphatic alcohols:
Neopentyl octylate,
neopentyl laurate, etc.
Compound Group (6)

Diesters of carboxylic acids with aromatic alcohols or branched aliphatic alcohols:
Dibenzyl sebacate,
dineopentyl 4,4'-diphenyl carboxylate,
dibenzyl azodicarboxylate, etc.
Compound Group (7)

Other compounds:
Benzyl cinnamate, heptyl stearate, didecyl adipate, dilauryl adipate, dimyristyl adipate,
dicetyl adipate, distearyl adipate, trilaurin,
trimyristin, tristearin, dimyristin, distearin,
etc.
Esters 5:

(Fatty acid ester compounds obtained from aliphatic monohydric alcohols having 9 or more odd-numbered carbon atoms and aliphatic carboxylic acids having even-numbered carbon atoms, and fatty acid ester compounds having 17 to 23 carbon atoms in total, obtained from n-pentyl alcohol or n-heptyl alcohol and aliphatic carboxylic acids having 10 to 16 even-numbered carbon atoms are also effective.)
n-Pentadecyl acetate,
n-tridecyl butyrate, n-pentadecyl butyrate,
n-undecyl caproate, n-tridecyl caproate, n-pentadecyl caproate,
n-nonyl caprylate, n-undecyl caprylate, n-tridecyl caprylate, n-pentadecyl caprylate,
n-heptyl caprate, n-nonyl caprate, n-undecyl caprate, n-tridecyl caprate, n-pentadecyl caprate,
n-pentyl laurate, n-heptyl laurate, n-nonyl laurate, n-undecyl laurate, n-tridecyl laurate, n-pentadecyl laurate,
n-pentyl myristate, n-heptyl myristate, n-nonyl myristate, n-undecyl myristate, n-tridecyl myristate, n-pentadecyl myristate,
n-pentyl palmitate, n-heptyl palmitate, n-nonyl palmitate, n-undecyl palmitate, n-tridecyl palmitate, n-pentadecyl palmitate,
n-nonyl stearate, n-undecyl stearate, n-tridecyl stearate, n-pentadecyl stearate,
n-nonyl eicosanate, n-undecyl eicosanate, n-tridecyl eicosanate, n-pentadecyl eicosanate,
n-nonyl behenate, n-undecyl behenate, n-tridecyl behenate, n-pentadecyl behenate, etc.
Ketones:

(Aliphatic ketones having 10 or more carbon atoms in total)
2-Decanone, 3-decanone, 4-decanone,
2-undecanone, 3-undecanone, 4-undecanone, 5-undecanone,
2-dodecanone, 3-dodecanone, 4-dodecanone, 5-dodecanone,
2-tridecanone, 3-tridecanone,
2-tetradecanone,
2-pentadecanone, 8-pentadecanone,
2-hexadecanone, 3-hexadecanone,
9-heptadecanone, 2-pentadecanone, 2-octadecanone,
2-nonadecanone, 10-nonadecanone,
2-eicosanone, 11-eicosanone,
heneicosanone, 2-docosanone,
laurone, stearone, etc.
Ethers:

(Aliphatic ethers having 10 or more carbon atoms in total)
Dipentyl ether, dihexyl ether, diheptyl ether,
dioctyl ether, dinonyl ether, didecyl ether,
diundecyl ether, didodecyl ether, ditridecyl ether, ditetradecyl ether, dipentadecyl ether,
dihexadecyl ether, dioctadecyl ether,
decanediol dimethyl ether, undecanediol dimethyl ether, dodecanediol dimethyl ether, tridecanediol dimethyl ether,
decanediol diethyl ether, undecanediol diethyl ether, etc.

The component-(d) light-fastness providing agent used in the present invention is exemplified in Table 4 below.

TABLE 4

Compound groups, and exemplary compounds thereof

1. Compounds having no substituent in the aromatic ring:

1,1-Bis(4-hydroxyphenyl)-n-hexane,
1,1-bis(4-hydroxyphenyl)-2-ethylbutane,
1,1-bis(4-hydroxyphenyl)-2-methylpentane,
1,1-bis(4-hydroxyphenyl)-n-octane,
1,1-bis(4-hydroxyphenyl)-2,3-dimethylpentane,
1,1-bis(4-hydroxyphenyl)-n-octane,
1,1-bis(4-hydroxyphenyl)-2-ethylhexane,
1,1-bis(4-hydroxyphenyl)-n-nonane,
1,1-bis(4-hydroxyphenyl)-n-decane,
1,1-bis(4-hydroxyphenyl)-3,7-dimethyloctane,
1,1-bis(4-hydroxyphenyl)-n-undecane,
1,1-bis(4-hydroxyphenyl)-n-dodecane,
1,1-bis(4-hydroxyphenyl)-n-tridecane,
1,1-bis(4-hydroxyphenyl)-n-tetradecane,
1,1-bis(4-hydroxyphenyl)-n-pentadecane,
1,1-bis(4-hydroxyphenyl)-n-hexadecane,
1,1-bis(4-hydroxyphenyl)-n-heptadecane,
1,1-bis(4-hydroxyphenyl)-n-octadecane, 2. Compounds having one substituent in the aromatic ring:

1,1-Bis(3-methyl-4-hydroxyphenyl)-n-hexane,
1,1-bis(3-methyl-4-hydroxyphenyl)-2-ethylbutane,
1,1-bis(3-methyl-4-hydroxyphenyl)-2-methylpentane,
1,1-bis(3-methyl-4-hydroxyphenyl)-n-octane,
1,1-bis(3-methyl-4-hydroxyphenyl)-2-ethylhexane,
1,1-bis(3-methyl-4-hydroxyphenyl)-n-decane,
1,1-bis(3-methyl-4-hydroxyphenyl)-3,7-dimethyloctane,
1,1-bis(3-methyl-4-hydroxyphenyl)-n-dodecane,
1,1-bis(3-methyl-4-hydroxyphenyl)-n-tetradecane,
1,1-bis(3-methyl-4-hydroxyphenyl)-n-hexadecane,
1,1-bis(3-methyl-4-hydroxyphenyl)-n-octadecane,
1,1-bis(3-ethyl-4-hydroxyphenyl)-n-decane,
1,1-bis(3-n-propyl-4-hydroxyphenyl)-n-decane,
1,1-bis(3-isopropyl-4-hydroxyphenyl)-n-decane,
1,1-bis(3-n-butyl-4-hydroxyphenyl)-n-decane,
1,1-bis(3-sec-butyl-4-hydroxyphenyl)-n-decane,
1,1-bis(3-isobutyl-4-hydroxyphenyl)-n-decane,
1,1-bis(3-tert-butyl-4-hydroxyphenyl)-n-decane,
1,1-bis(3-fluoro-4-hydroxyphenyl)-n-decane,
1,1-bis(3-chloro-4-hydroxyphenyl)-n-decane,
1,1-bis(3-bromo-4-hydroxyphenyl)-n-decane,
1,1-bis(3-iodo-4-hydroxyphenyl)-n-decane,
1,1-bis(2-methyl-4-hydroxyphenyl)-n-decane,
1,1-bis(2-ethyl-4-hydroxyphenyl)-n-decane,
1,1-bis(2-chloro-4-hydroxyphenyl)-n-decane,
1,1-bis(2-bromo-4-hydroxyphenyl)-n-decane, etc.

3. Compounds having two substituents in the aromatic ring:

1,1-Bis(2,3-dimethyl-4-hydroxyphenyl)-n-decane,
1,1-bis(2-methyl-4-hydroxy-5-tert-butylphenyl)-n-decane,
1,1-bis(2,6-dimethyl-4-hydroxyphenyl)-n-decane,
1,1-bis(3,5-dimethyl-4-hydroxyphenyl)-n-decane,
1,1-bis(3,5-di-sec-butyl-4-hydroxyphenyl)-n-decane,
1,1-bis(3,5-di-tert-butyl-4-hydroxyphenyl)-n-decane, etc.

4. Compounds having three substituents in the aromatic ring:

1,1-Bis(2,3,5-trimethyl-4-hydroxyphenyl)-n-decane,
1,1-bis(2,3,6-trimethyl-4-hydroxyphenyl)-n-decane, etc.

The component-(e) light stabilizer used in the present invention is exemplified in Table 5 below.

TABLE 5

Compound groups, and exemplary compounds thereof

Benzophenone type ultraviolet absorbers:

2,4-dihydroxydibenzophenone,
2-hydroxy-4-methoxybenzophenone,
2,2'-dihydroxy-4,4'-dimethoxybenzophenone,
2,2',4,4'-tetrahydroxybenzophenone,
2-hydroxy-4-methoxybenzophenone-5-sulfonic acid,
2-hydroxy-4-n-octyloxybenzophenone,
bis-(2-methoxy-4-hydroxy-5-benzoylphenyl)methane,
2-(2'-hydroxy-3'5'-di-t-amylphenyl)-benzophenone,
2-hydroxy-4-octadecyloxybenzophenone,
2-hydroxy-4-n-dodecyloxybenzophenone,
2,2'-dihydroxy-4-methoxybenzophenone, and
2-hydroxy-4-benzyloxybenzophenone.

Salicylic acid type ultraviolet absorbers:

2,4-di-t-butylphenyl-3,5-di-t-butyl-4-hydroxybenzoate,
phenyl salicylate,
4-t-butylphenyl salicylate,
4-t-octylphenyl salicylate, and
resorcinol monobenzoate.

Cyanoacrylate type ultraviolet absorbers:

ethyl-2-cyano-3,3-diphenyl acrylate, and
2-ethylhexyl-2-cyano-3,3-diphenyl acrylate Benzotriazole type ultraviolet absorbers:

2-(5-t-butyl-2-hydroxyphenyl)-benzotriazole,
2-(5-methyl-2-hydroxyphenyl)-benzotriazole,
2-[2-hydroxy-3,5-bis(a,a-dimenthylbenzyl)phenyl]-2H-benzotriazole,
2-(3,5-di-t-butyl-2'-hydroxyphenyl)-benzotriazole,
2-(3-t-butyl-5-methyl-2-hydroxyphenyl)-5-chlorobenzotriazole,
2-(3,5-di-t-butyl-2-hydroxyphenyl)-5-chlorobenzotriazole,
2-(3,5-di-t-amyl-2-hydroxyphenyl)benzotriazole,
a condensate of methyl-3-[3-t-butyl-5-(2H-benzotriazol-2-yl)-4-hydroxyphenyl] propionate with polyethylene glycol having a molecular weight of 300,
2-(3-t-dodecyl-5-methyl-2-hydroxyphenyl)-benzotriazole,
a condensate of methyl-3-[3-(2H-benzotriazol-2-yl)-5-t-butyl-4-hydroxyphenyl] propionate with polyethylene glycol having a molecular weight of 300,
2-(3-t-butyl-5-propyloxycarbonylethyl-2-hydroxyphenyl)-5-chlorobenzotriazole,
2-[2-hydroxyphenyl-3,5-di-(1,1'-dimethylbenzyl)phenyl]-2H-benzotriazole,
2-(2-hydroxy-5-t-octylphenyl)-2H-benzotriazole,
2-(3-t-butyl-5-octyloxycarbonylethyl-2-hydroxyphenyl)-benzotriazole,
2-(2-hydroxy-4-octyloxyphenyl)-2H-benzotriazole,
2-[2'-hydroxy-3'-(3",4",5",6"-tetrahydrophthalimidomethyl)-5'-methylphenyl]-benzotriazole, and
2-(2-hydroxy-5-t-butylphenyl)-benzotriazole.

Oxalic anilide type ultraviolet absorbers:

ethanediamido-N-(2-ethoxyphenyl)-N'-(4-isododecylphenyl, and
2,2,4,4-tetramethyl-20-(β-lauryloxycarbonyl)-ethyl-7-oxa-3,20-diazadispiro(5,1,11,2)heneicosan-21-one.

Hindered amine type antioxidants:

dimethyl succinate [1-(2-hydroxyethyl)-4-hydroxy-2,2,6,6-tetramethylpiperidine] polycondensate,
poly[{(2,2,6,6-tetramethyl-4-piperidyl)imino}{6-(1,1,3,3-tetramethylbutyl)imino-1,3,5-triazine-2,4-diyl}{(2,2,6,6-tetramethyl-4-piperidyl)imino}hexamethylene],
bis(1,2,2,6,6-pentamethyl-4-piperidyl 2-(3,5-di-t-butyl-4-hydroxybenzyl)-2-n-butylmalonate,

TABLE 5-continued

Compound groups, and exemplary compounds thereof

N,N'-bis(3-aminopropyl)ethylenediamine-2,4-bis[N-butyl-N-(1,2,2,6,6-pentamethyl-4-piperidyl)amino]-6-chlorol,3,5-triazine condensate
bis-(1,2,2,6,6-pentamethyl-4-piperidyl) sebacate,
4-benzoyloxy-2,2,6,6-pentamethylpiperidine.
bis-(2,2,6,6-tetramethyl-4-piperidyl) sebacate,
1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, and
8-acetyl-3-dodecyl-7,7,9,9-tetramethyl-1,3,8-triazaspiro(4,5)decane-2,4-dione.

Phenol type antioxidants:

2,6-di-t-butyl-4-methylphenol,
a mixture of 2-t-butyl-4-methylphenol with 3-t-butyl-4-methylphenol,
2,6-di-t-butyl-4-ethylphenol,
octadecyl-3-(3,5-di-t-butyl-4-hydroxyphenyl) propionate,
2,2-methylenebis(4-methyl-6-t-butylphenol),
4,4-thiobis(3-methyl-6-t-butylphenol),
2,2-thiobis(4-methyl-6-t-butylphenol),
4,4-butylidenebis(3-methyl-6-t-butylphenol),
3,9-bis[1,1-dimethyl-2-{β-3-t-butyl-4-hydroxy-5-methylphenyl)propionyloxy}ethyl]-2,4,8,10-tetraoxaspiro(5,5)undecane,
1,1,3-tris(2-methyl-4-hydroxy-5-t-butylphenyl)butane,
1,3,5-trimethyl-2,4,6-tris(3,5-di-t-butyl-4-hydroxybenzyl)benzene,
tetrakis[methylene-3-(3',5'-di-t-hydroxyphenyl) propionate]-methane,
2,2-ethylenebis(4,6-di-t-butylphenol),
bis[3,3'-bis-(4'-hydroxy-3'-t-butylphenyl)butyric acid] glycol ester,
1,3,5-tris(3',5'-di-t-butyl-4'-hydroxybenzyl)-S-triazine-2,4,6-(1H,3H,5H)trione,
tocopherol,
1,3,5-tris(4-t-butyl-3-hydroxy-2,6-dimethylbenzyl) isocyanurate,
pentaerithritoltetrakis(3-laurylthiopropionate),
triethylene glycol-bis[3-(3-t-butyl-5-methyl-4-hydroxyphenyl) propionate],
1,6-hexanediol-bis[3-(3,5-di-t-butyl-4-hydroxyphenyl) propionate],
2,2-thioethylenebis[3-(3,5-di-t-butyl-4-hydroxyphenyl) propionate],
N,N'-hexamethylenebis(3,5-di-t-butyl-4-hydroxy-hydroxycinnamide),
tris-(3,5-di-t-butyl-4-hydroxybenzyl) isocyanurate,
polymerized-2,2,4-trimethyl-1,2-hydroquinone,
styrenated phenol
2,5-di-t-butylhydroquinone,
2,4-bis-(n-octylthio)-6-(4-hydroxy-3,5-di-t-butylanilino)-1,3,5-triazine, and
octylated diphenylamine.

Sulfur type antioxidants:

dilauryl 3,3'-thiodipripionate,
dimyristyl 3,3'-thiodipropionate,
distearyl 3,3'-thiodipripionate, and
stearyl thiopropylamide.

Phosphorus type antioxidants:

tris(2,4-di-t-butylphenyl) phosphite,
bis(2,4-di-t-butylphenyl)pentaerythritol diphosphite,
3,5-di-t-butyl-4-hydroxy-benzylphosphonate-diethyl ester,
triphenyl phosphite,
diphenylisodecyl phosphite,
phenyldiisodecyl phosphite,
4,4'-butylidene-bis(3-methyl-6-t-butylphenylditridecyl) phosphite,
octadecyl phosphite,

TABLE 5-continued

Compound groups, and exemplary compounds thereof tris(nonylphenyl) phosphite,
9,10-dihydro-9-oxa-10-phosphaphenanthrene-10-oxide,
10-(3,5-di-t-butyl-4-hydroxybenzyl)-9,10-dihydro-9-oxa-10-phosphaphenanthrene-10-oxide,
10-decyloxy-9,10-dihydro-9-oxa-10-phosphaphenanthrene,
cyclic neopentatetraylbis(2,4-di-t-butylphenyl) phosphite,
cyclic neopentatetraylbis(2,6'-di-t-butyl-4-methylphenyl) phosphite, and
2,2-methylenebis(4,6-di-t-butyl-4-methylphenyl)octyl phosphite.

Singlet oxygen quenchers:

1,4-diazacyclo(2,2,2)octane,
β-carotene,
1,3-cyclohexadiene,
2-diethylaminomethylfuran,
2-phenylaminomethylfuran,
2-diethylaminomethylanthracene,
5-diethylaminomethyl-6-phenyl-3,4-dihydroxypyrane,
nickel dimethylthiocarbamate,
nickel dibutylthiocarbamate,
nickel 3,5-di-t-butyl-4-hydroxybenzyl-phosphoric acid monoethylate,
nickel 3,5-di-t-butyl-4-hydroxybenzyl-phosphoric acid monobutylate,
[2,2-di-thiobis(4-t-octylphenolato]-(n-butylamine)nickel,
[2,2-di-thiobis(4-t-octylphenolato]-(2-ethylhexylamine)nickel,
bis[2,2'-thiobis(4-t-octylphenolato]nickel,
bis[2,2'-sulfone(4-t-octylphenolato]nickel,
bis(dithiobenzyl)nickel, and
bis(dithioacetyl)nickel.

Super oxide anionic quenchers:

complex of super oxide disumtase with cobalt and nickel.

Ozone quenchers:

4,4'-thiobis{6-t-butyl(6-t-butyl-m-cresol)}
2,4,6-tri-t-butylphenol,
1,4-diazacyclo(2,2,2)octane,
N-phenyl-β-naphthylamine,
α-tocopherol,
4,4'-methylenebis(2,6-di-t-butylphenol)
p,p'-diaminophenylmethane,
2,2'-methylene-bis(6-t-butyl-p-cresol)
N,N'-diphenyl-p-phenylenediamine,
N,N'-diphenylethylenediamine, and
N-isopropyl-N'-phenyl-p-phenylenediamine.

Visible light ray absorbers, dyes:

C.I. Solvent Yellow 19, 21, 61,
C.I. Solvent Orange 5, 6,
C.I. Solvent Red 8, 24,
C.I. Solvent Violet 14, 21,
C.I. Solvent Blue 11, 25, and
C.I. Solvent Black 5, 125.

Visible light ray absorbers, pigments:

Color Index Number 10825, 11680, 11725, 11780, 12060, 12120, 12490, 12500, 12710, 21090, 21110, 21165, 21180, 21205, 45170, 50440, 58055, 69800, 69810, 70600, 74160, 74265, 127755.

As the ultraviolet rays absorbers, compounds represented by the following Formulas II to X may be used, which desirably have a maximum absorption in the near infrared region of 700 to 2,000 nm and not too great absorption at the visible region of 400 to 70 nm.

Formula II

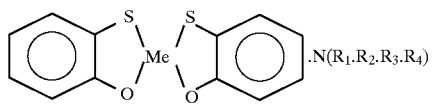

wherein $R_1$, $R_2$, $R_3$ and $R_4$ each represent an alkyl group; and Me represents Ni, Pd or Pt.

Formula III

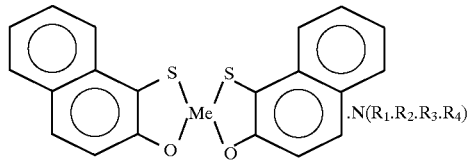

wherein $R_1$, $R_2$, $R_3$ and $R_4$ each represent an alkyl group; and Me represents Ni, Pd or Pt.

Formula IV

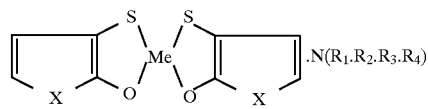

wherein $R_1$, $R_2$, $R_3$ and $R_4$ each represent an alkyl group; Me represents Ni, Pd or Pt; and X represents C, O or S.

Formula V

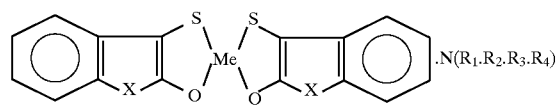

wherein $R_1$, $R_2$, $R_3$ and $R_4$ each represent an alkyl group; Me represents Ni, Pd or Pt; and X represents C, O or S.

Formula VI

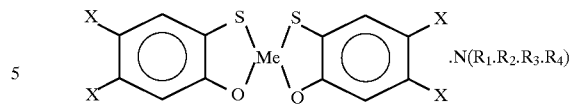

wherein $R_1$, $R_2$, $R_3$ and $R_4$ each represent an alkyl group; Me represents Ni, Pd or Pt; and X represents a halogen atom or H.

Formula VII

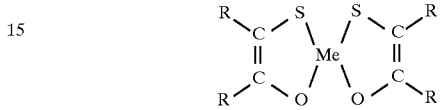

wherein R represents H, an alkyl group, a phenyl group, an alkyl- or alkoxy-substituted phenyl group, or a thienyl group; and Me represents Ni, Pd or Pt.

Formula VIII

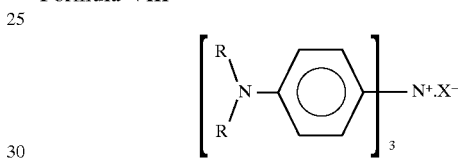

wherein R represents an alkyl group; and X represents as an anion a perchlorate, a fluoroborate, a trichloroacetate, a trifluoroacetate, a picrate, a hexafluoroarsenate, a hexachlroantimonate, a hexafluoroantimonate, a benzenesulfonate, an alkylsulfonate, a phosphate, a sulfate, a chloride or a bromide.

Formula IX

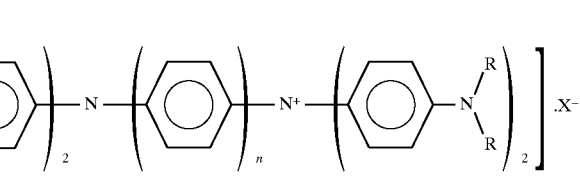

wherein R represents an alkyl group; and X represents as an anion a perchlorate, a fluoroborate, a trichloroacetate, a trifluoroacetate, a picrate, a hexafluoroarsenate, a hexachlroantimonate, a hexafluoroantimonate, a benzenesulfonate, an alkylsulfonate, a phosphate, a sulfate, a chloride or a bromide.

Formula X

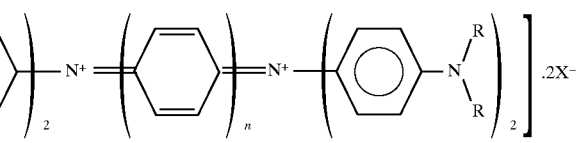

wherein R represents an alkyl group; and X represents as an anion a perchlorate, a fluoroborate, a trichloroacetate, a trifluoroacetate, a picrate, a hexafluoroarsenate, a hexachlroantimonate, a hexafluoroantimonate, a benzenesulfonate, an alkylsulfonate, a phosphate, a sulfate, a chloride or a bromide.

The light-screening pigment which may be used in the present invention in the layer formed of the light stabilizer and the component-(f) metallic luster pigment refers to pigments such as metallic luster pigments, transparent titanium dioxide, transparent iron oxide, transparent cesium oxide and transparent zinc oxide.

The metallic luster pigment may include metallic luster pigments having a particle size of from 5 to 100 μm, comprising natural mica powder whose particle surfaces are coated with titanium oxide. It may more specifically include a golden luster pigment having a particle size of from 5 to 60 μm, comprised of natural mica powder whose particle surfaces are coated with 41 to 44% by weight of titanium oxide; a silvery luster pigment having a particle size of from 5 to 100 μm, comprised of natural mica powder whose particle surfaces are coated with 16 to 39% by weight of titanium oxide; a metallic-colored metal luster pigment having a particle size of from 50 to 60 μm, comprised of natural mica powder whose particle surfaces are coated with 45 to 58% by weight of titanium oxide, the resulting coated particles being further coated with 4 to 10% by weight of iron oxide; and a metallic-colored metal luster pigment having a particle size of from 5 to 60 μm, comprised of natural mica powder whose particle surfaces are coated with 45 to 58% by weight of titanium oxide, the resulting coated particles being further coated with 0.5 to 10% by weight of a non-thermochromic color dye or pigment.

These substances capable of chiefly screening ultraviolet rays may be used in the composition by mixing any of them in an amount of from 0.1 to 40 parts by weight based on 1 part by weight of the component-(a) compound. Alternatively, or in combination therewith, a layer containing any of these substances in an amount of from 0.1 to 40 parts by weight may be formed superposed on a thermochromic layer formed of the reversible thermochromic composition comprised of the components (a) to (e).

The reversible thermochromic composition according to the present invention may be applied to a substrate in the state in which components (a) to (e) are dispersed in a resin binder.

As the substrate, paper, cloth, metallic products, synthetic resin products, ceramic products, concrete products and so forth.

The components (a) to (e) may preferably be enclosed in microcapsules when used to prepare the composition and the microcapsules can be mixed in resin binder to form homogeneous composition.

EXAMPLES

The present invention will be described below in greater detail. Production of the reversible thermochromic composition is shown first as "Production Examples".

Production Example 1

1.5 parts by weight of 3,3-bis-(2-ethoxy-4-diethylaminophenyl-4-azaphthalide, 5 parts by weight of 2,2-bis-(4-hydroxyphenyl)-propane, 40 parts by weight of cetyl caprate, 10 parts by weight of decyl myristate, 3 parts by weight of 1,1-bis(4-hydroxyphenyl)-n-decane and 5 parts by weight of 2-(3-t-butyl-5-methyl-2-hydroxyphenyl)-5-chlorobenzotriazole were heated and dissolved at 120 to form a homogeneous mixture (mutual solution), which was then mixed in a mixture solution of 10 parts by weight of EPON 828 (trade name; an epoxy resin available from Yuka Shell Epoxy Kabushiki Kaisha). Thereafter, the mixture obtained was dropwise added to 100 parts by weight of an aqueous 10% gelatin solution, followed by stirring so as to form minute droplets. A solution separately prepared by dissolving 5 parts by weight of a curing agent EPICURE U (trade name; an amine adduct of epoxy resin available from Yuka Shell Epoxy Kabushiki Kaisha) in 45 parts by weight of water was added little by little in the above solution being stirred. While keeping the liquid temperature at 80° C., the stirring was continued for about 5 hours to obtain a microcapsular material solution. This material solution was centrifuged to obtain a reversible thermochromic composition, Composition No. 1, capable of varying in color between blusish green and colorless, having a water content of about 40% by weight.

Production Examples 2 to 35

The procedure of Production Example 1 was repeated to obtain reversible thermochromic compositions, Compositions Nos. 2 to 35, except that the combination of the components (a) to (e) were changed as shown in Tables 6 to 13.

Composition and color variation (metachromatism) of these reversible thermochromic compositions Nos. 1 to 35 are shown in Tables 6 to 13.

(Tables 6–13)

In Tables 6 to 13, mixing proportions are indicated as part(s) by weight.

Compositions Nos. 1 to 25 are compositions used in the present invention. Compositions Nos. 26 to 35 are compositions used as Comparative Examples.

Light-fastness of the reversible thermochromic compositions used in the present invention will be demonstrated below.

Example 1

10 parts by weight of the reversible thermochromic composition obtained in Production Example 1, 45 parts by weight of a xylene solution of acrylic resin (resin solid matter: 50%), 20 parts by weight of xylene and 20 parts by weight of methyl isobutyl ketone were uniformly mixed with stirring, and the mixture obtained was spray-coated on a white vinyl chloride sheet by means of a spray gun to provide thereon a reversible thermochromic layer of about 40 μm thick. The spray-coated products thus obtained were used as a light-fastness test sample of Example 1.

Light-fastness tests made using this construction are indicated herein as Type 1.

Examples 2 to 15

The procedure of Example 1 was repeated except that the reversible thermochromic composition was replaced with the compositions as shown in Table 14 thus provoding Examples 2 to 15.

Comparative Example 1

10 parts by weight of the reversible thermochromic composition obtained in Production Example 26, 45 parts by weight of a xylene solution of acrylic resin (resin solid matter: 50%), 20 parts by weight of xylene and 20 parts by weight of methyl isobutyl ketone were uniformly mixed with stirring, and the mixture obtained was spray-coated on a white vinyl chloride sheet by means of a spray gun to provide thereon a reversible thermochromic layer of about 40 μm thick. The spray-coated products thus obtained were used as Comparative Example 1.

Comparative Examples 2 and 3

The procedure of Comparative Example 1 was repeated except that the reversible thermochromic composition was replaced with the compositions as shown in Table 14 thus providing Comparative Examples 2 and 3.

(Table 14)

Example 16

A mixture prepared by uniformly mixing with stirring, stated parts by weight of a light stabilizer, 45 parts by weight of a xylene solution of acrylic resin (resin solid matter: 50%), 20 parts by weight of xylene and 20 parts by weight of methyl isobutyl ketone was spray-coated by means of a spray gun on the surface of a reversible thermochromic layer formed in the same manner as in Example 1 using the reversible thermochromic composition obtained in Production Example 1, to obtain a spray-coated product having a double layer, multi-layer construction provided with a light-stabilizer layer of about 35 μm thick, which was used as a test sample in Example 16.

Light-fastness tests made under this constitution are herein indicated as Type 2.

Examples 17 to 40

The procedure of Example 16 was repeated except that the reversible thermochromic composition was replaced with the compositions as shown in Tables 15 to 18 thus providing Examples 17 to 40.

Comparative Example 4

The procedure of Example 16 was repeated except that the reversible thermochromic composition was replaced with the composition obtained in Production Example 26. The product obtained was used as Comparative Example 4.

Comparative Examples 5 to 13

The procedure of Comparative Example 4 was repeated except that the reversible thermochromic composition was replaced with the compositions as shown in Tables 17 and 18. The product obtained was used as Comparative Examples 5 to 13.

(Tables 15–18)

Example 41

A mixture prepared by uniformly mixing with stirring, 10 parts by weight of a light- screening pigment as a metallic luster pigment, stated parts by weight of a light stabilizer, 45 parts by weight of a xylene solution of acrylic resin (resin solid matter: 50%), 20 parts by weight of xylene and 20 parts by weight of methyl isobutyl ketone was spray- coated by means of a spray gun on the surface of a reversible thermo-chromic layer formed in the same manner as in Example 1 using the reversible thermochromic composition obtained in Production Example 1, to form a joint layer of about 35 μm thick.

A mixture prepared by uniformly mixing with stirring, stated parts by weight of a light stabilizer, 45 parts by weight of a xylene solution of acrylic resin (resin solid matter: 50%), 20 parts by weight of xylene and 20 parts by weight of methyl isobutyl ketone was further spray-coated by means of a spray gun on the surface of the joint layer to form a light-stabilizer layer of about 35 μm thick. Thus, a spray-coated product having a triple layer, multi-layer construction was obtained, which was used as a test sample of Example 1.

Light-fastness tests made under this constitution are herein indicated as Type 3.

Examples 42 to 52

The procedure of Example 41 was repeated except that the reversible thermochromic composition was replaced with the compositions as shown in Tables 19 and 20 providing the test samples of Examples 42 to 52.

Comparative Example 14

The procedure of Example 41 was repeated except that the reversible thermochromic composition was replaced with the composition obtained in Production Example 26. The product obtained was used as a test sample of Comparative Example 14.

Comparative Example 15

The procedure of Example 41 was repeated except that the reversible thermochromic composition was replaced with the composition obtained in Production Example 28. The product obtained was used as a test sample of Comparative Example 15.

(Tables 19–20)

In the tables, light-screening pigments IRIODIN 225 and IRIODIN 235 are trade names for pearly luster pigments available from Merck Japan Limited, which are used as metallic luster pigments.

Results of the light-fastness test are shown below.

The light-fastness test for Examples 1 to 52 and Comparative Examples 1 to 15 is a test for examining light-fastness to carbon arc lamps. The carbon arc lamp light-fastness test was made according to a standard of JIS L-0842. As a carbon arc lamp light-fastness test machine, FA-1, manufactured by Suga Shikenki K.K., was used.

With regard to carbon arc lamp exposure time, in Examples 1 to 15 and Comparative Examples 1 to 3, test sample pieces were prepared for each exposure time at five points of 10 hour exposure, 20 hour exposure, 30 hour exposure, 40 hour exposure and 50 hour exposure.

In Examples 16 to 37 and Comparative Examples 4 to 10, test sample pieces were prepared for each exposure time at five points of 40 hour exposure, 60 hour exposure, 80 hour exposure, 100 hour exposure and 120 hour exposure; and in Examples 38 to 40 and Comparative Examples 11 to 13, at five points of 100 hour exposure, 140 hour exposure, 180 hour exposure, 220 hour exposure and 260 hour exposure.

In Examples 41 to 43 and Comparative Example 14, test sample pieces were prepared for each exposure time at six points of 40 hour exposure, 60 hour exposure, 80 hour exposure, 100 hour exposure, 120 hour exposure and 140 hour exposure.

In Examples 44 to 52 and Comparative Example 15, test sample pieces were prepared for each exposure time at six points of 80 hour exposure, 100 hour exposure, 120 hour exposure, 140 hour exposure, 160 hour exposure and 180 hour exposure.

The results of the light-fastness test are shown together in Tables 14 to 20.

As is seen from the test results shown in Tables 14 to 20, the reversible thermochromic compositions of Examples according to the present invention show a higher color forming density (coloring density) after their exposure to light in the color-extinguished state, and are seen to have a superior light-fastness at the time of color extinguishment.

Coloring density attenuation of Examples and that of Comparative Examples having the composition from which the component (d) is removed are graphically shown in the accompanying drawings, FIGS. 1 to 18. FIGS. 1 to 18 graphically represent the test results in Examples and Comparative Examples.

Straight lines in FIG. 1 indicate the results of Examples 3, 2 and 1 in this order from the top, and the line at the lowest part, Comparative Example 1. As is seen from the graphs, the present invention brings about a superior light-fastness.

Figure 2:
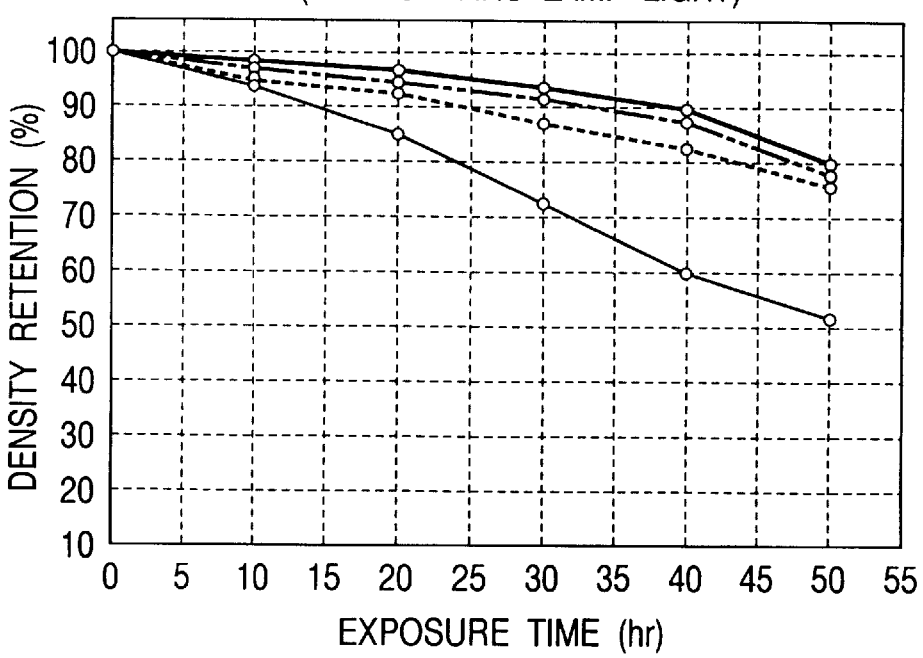

Straight lines in FIG. 2 indicate the results of Examples 6, 5 and 4 in this order from the top, and the line at the lowest part, Comparative Example 2. As is seen from the graphs, the present invention brings about a superior light-fastness.

Figure 3:
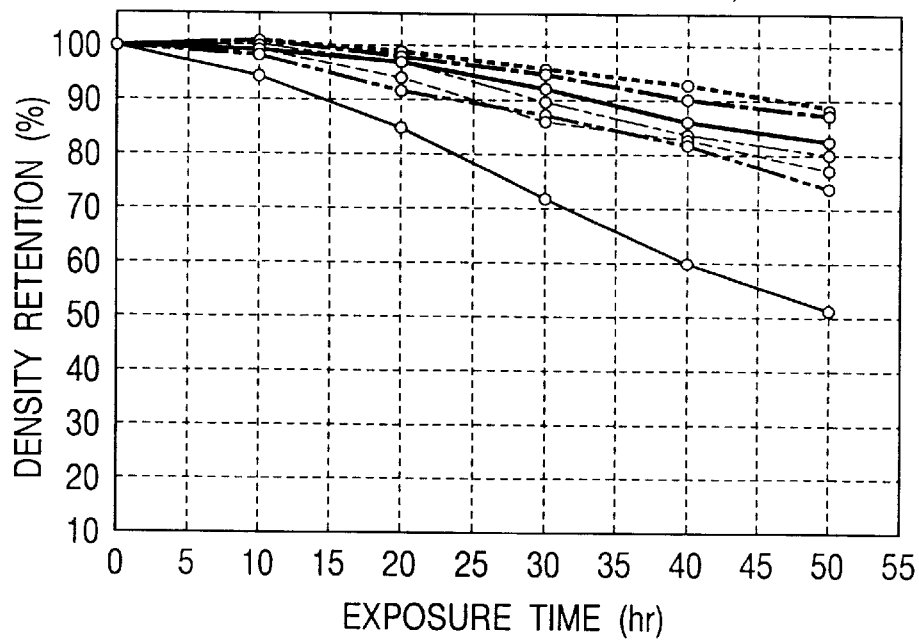

Straight lines in FIG. 3 indicate the results of Examples 9, 10, 12, 8, 7 and 11 in this order from the top, and the line at the lowest part, Comparative Example 2. As is seen from the graphs, the present invention brings about a superior light-fastness.

Figure 4:
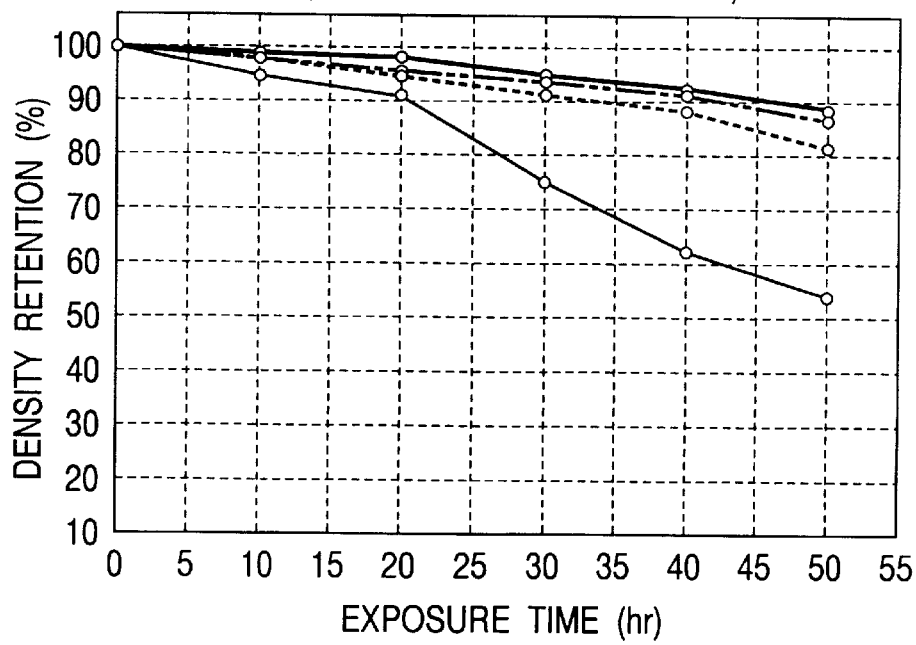

Straight lines in FIG. 4 indicate the results of Examples 15, 14 and 13 in this order from the top, and the line at the lowest part, Comparative Example 3. As is seen from the graphs, the present invention brings about a superior light-fastness.

Straight lines in FIG. 5 indicate the results of Examples 18, 17 and 16 in this order from the top, and the line at the lowest part, Comparative Example 4. As is seen from the graphs, the present invention brings about a superior light-fastness.

Straight lines in FIG. 6 indicate the results of Examples 22, 21, 20 and 19 in this order from the top, and the line at the lowest part, Comparative Example 5. As is seen from the graphs, the present invention brings about a superior light-fastness.

Straight lines in FIG. 7 indicate the results of Examples 25, 24 and 23 in this order from the top, and the line at the lowest part, Comparative Example 6. As is seen from the graphs, the present invention brings about a superior light-fastness.

Straight lines in FIG. 8 indicate the results of Examples 28, 31, 29, 27, 30 and 26 in this order from the top, and the line at the lowest part, Comparative Example 6. As is seen from the graphs, the present invention brings about a superior light-fastness.

Straight lines in FIG. 9 indicate the results of Examples 34, 33 and 32 in this order from the top, and the line at the lowest part, Comparative Example 7. As is seen from the graphs, the present invention brings about a superior light-fastness.

An upper straight line in FIG. 10 indicates the results of Example 35, and the lower line, Comparative Example 8. As is seen from the graphs, the present invention brings about a superior light-fastness.

An upper straight line in FIG. 11 indicates the results of Example 36, and the lower line, Comparative Example 9. As is seen from the graphs, the present invention brings about a superior light-fastness.

An upper straight line in FIG. 12 indicates the results of Example 37, and the lower line, Comparative Example 10. As is seen from the graphs, the present invention brings about a superior light-fastness.

An upper straight line in FIG. 13 indicates the results of Example 38, and the lower line, Comparative Example 11. As is seen from the graphs, the present invention brings about a superior light-fastness.

An upper straight line in FIG. 14 indicates the results of Example 39, and the lower line, Comparative Example 12. As is seen from the graphs, the present invention brings about a superior light-fastness.

Figure 15:
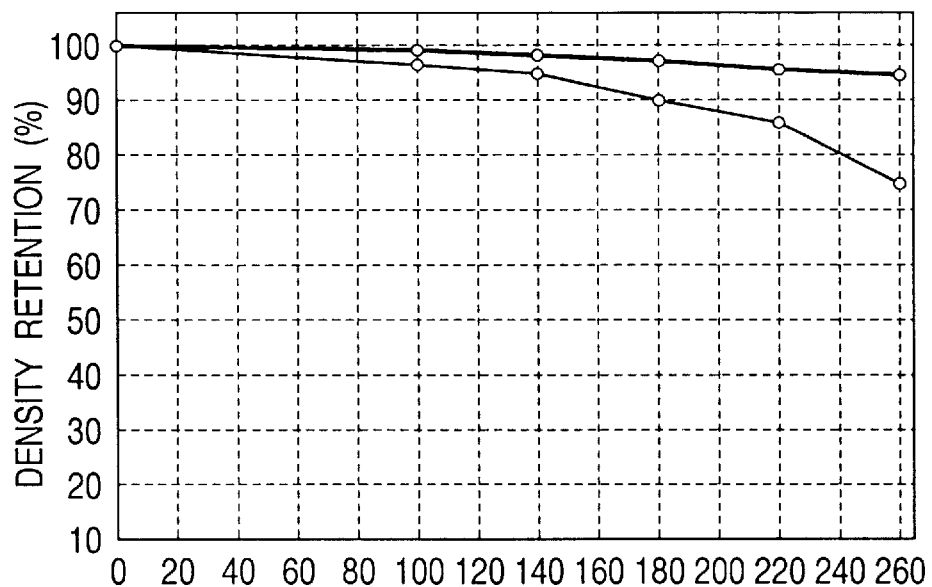

An upper straight line in FIG. 15 indicates the results of Example 40, and the lower line, Comparative Example 13. As is seen from the graphs, the present invention brings about a superior light-fastness.

Figure 16:
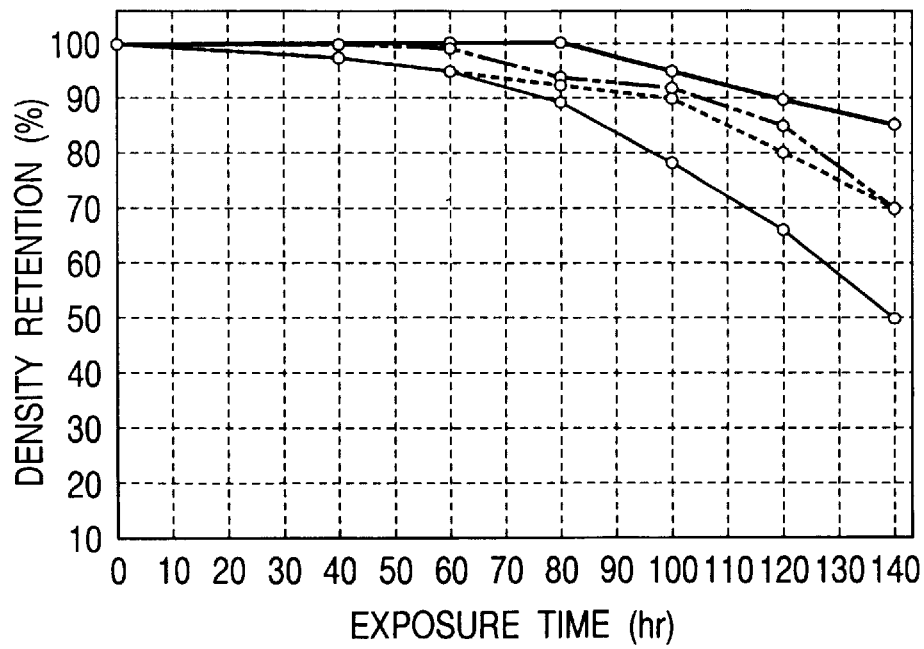

Straight lines in FIG. 16 indicate the results of Examples 43, 42 and 41 in this order from the top, and the line at the lowest part, Comparative Example 14. As is seen from the graphs, the present invention brings about a superior light-fastness.

Figure 17:
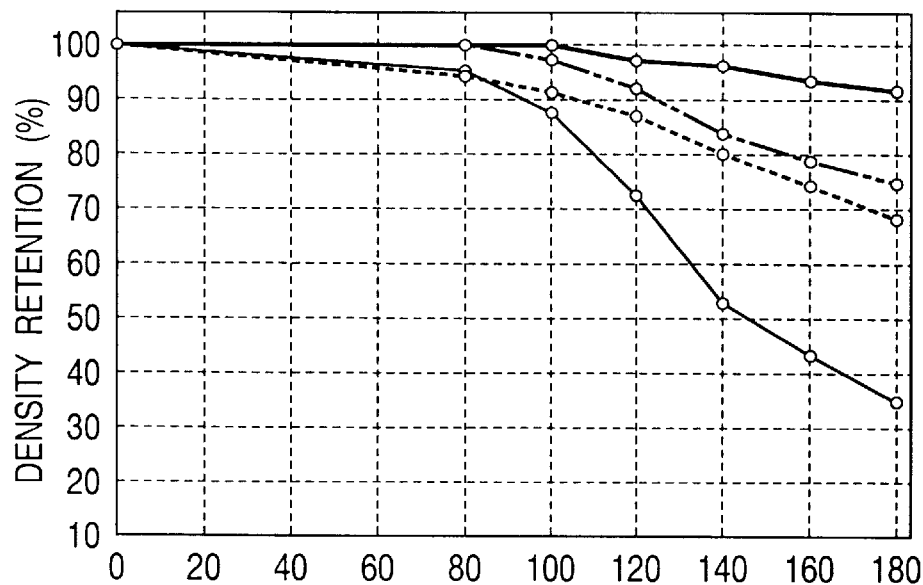

Straight lines in FIG. 17 indicate the results of Examples 46, 45 and 44 in this order from the top, and the line at the lowest part, Comparative Example 15. As is seen from the graphs, the present invention brings about a superior light-fastness.

Figure 18:
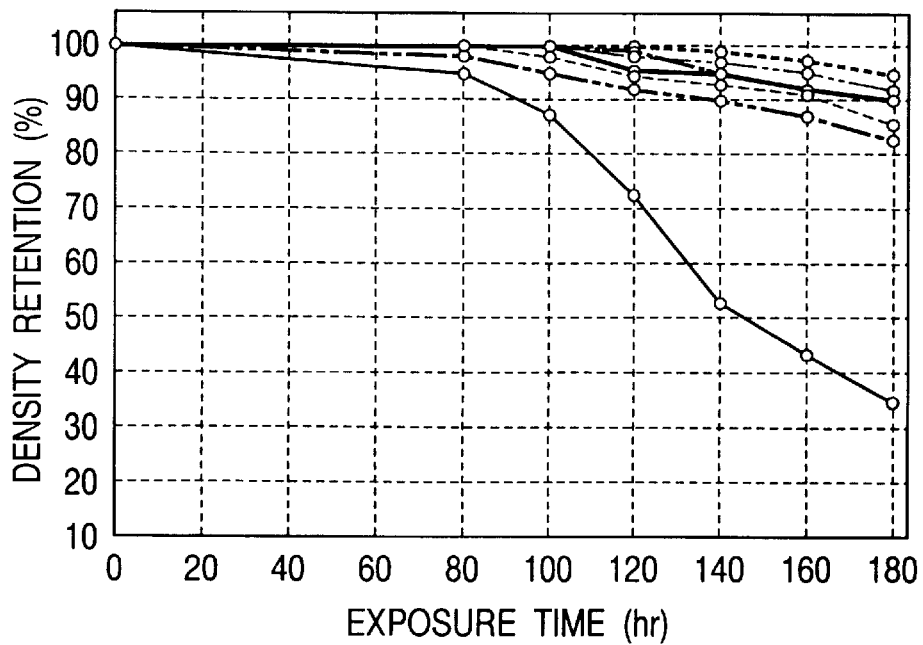

Straight lines in FIG. 18 indicate the results of Examples 49, 48, 50, 52, 47 and 51 in this order from the top, and the line at the lowest part, Comparative Example 15. Examples according to the present invention show a very superior light-fastness.

As described above, the present invention employs the specific light-fastness providing agent and the light-stabilizer layer in combination, and hence can be effective for improving light-fastness of reversible thermochromic compositions at the time of color extinguishment and maintaining reversible thermochromic properties over a long period of time.

TABLE 6

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 1 | 3,3-bis-(2-ethoxy-4-diethylamino-phenyl)-4-azaphthalide (1.5) | 2,2-bis-(4-hydroxyphen-yl)-propane (5) | cetyl caprate/ decyl myristate (40/10) | 1,1-bis-(4-hydroxy-phenyl)-n-decane (3) | 2-(3-t-butyl-5-methyl-2-hydroxyphen-yl)-5-chloro-benzotriazole (5) | bluish green ←→ colorless (20° C.) |
| 2 | 3,3-bis-(2-ethoxy-4- | 2,2-bis-(4-hydroxyphen- | cetyl caprate/ | 1,1-bis-(4-hydroxy- | 2-(3-t-butyl-5-methyl-2- | bluish green ←→ colorless (20° C.) |

TABLE 6-continued

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
|  | diethylamino-phenyl)-4-azaphthalide (1.5) | yl)-propane (3) | decyl myristate (40/10) | phenyl)-n-decane (5) | hydroxyphen-yl)-5-chloro-benzotriazole (5) |  |
| 3 | 3,3-bis-(2-ethoxy-4-diethylamino-phenyl)-4-azaphthalide (1.5) | 2,2-bis-(4-hydroxyphen-yl)-propane (0) | cetyl caprate/ decyl myristate (40/10) | 1,1-bis-(4-hydroxy-phenyl)-n-decane (8) | 2-(3-t-butyl-5-methyl-2-hydroxyphen-yl)-5-chloro-benzotriazole (5) | bluish green ←→ colorless (20° C.) |
| 4 | 2-(2-chloro-anilino)-6-di-n-butyl-aminofluoran (4) | 1,1-bis-(4-hydroxyphen-yl)-ethane (6) | hexadecyl alcohol/ stearyl caprate (25/25) | 1,1-bis-(4-hydroxy-phenyl)-n-dodecane (6) | 2-(3-t-butyl-5-methyl-2-hydroxyphenyl)-5-chloro-benzotriazole/ bis(1,2,2,6,6-pentamethyl-4-piperidyl) sebacate (5/1) | black ←→ colorless (30° C.) |
| 5 | 2-(2-chloro-anilino)-6-di-n-butyl-aminofluoran (4) | 1,1-bis-(4-hydroxyphen-yl)-ethane (4) | hexadecyl alcohol/ stearyl caprate (25/25) | 1,1-bis-(4-hydroxy-phenyl)-n-dodecane (8) | 2-(3-t-butyl-5-methyl-2-hydroxyphenyl)-5-chloro-benzotriazole/ bis(1,2,2,6,6-pentamethyl-4-piperidyl) sebacate (5/1) | black ←→ colorless (30° C.) |
| 6 | 2-(2-chloro-anilino)-6-di-n-butyl-aminofluoran (4) | 1,1-bis-(4-hydroxyphen-yl)-ethane (2) | hexadecyl alcohol/ stearyl caprate (25/25) | 1,1-bis-(4-hydroxy-phenyl)-n-dodecane (10) | 2-(3-t-butyl-5-methyl-2-hydroxyphenyl)-5-chloro-benzotriazole/ bis(1,2,2,6,6-pentamethyl-4-piperidyl) sebacate (5/1) | black ←→ colorless (30° C.) |
| 7 | 2-(2-chloro-anilino)-6-di-n-butyl-aminofluoran (4) | 1,1-bis-(4-hydroxyphen-yl)-ethane (0) | hexadecyl alcohol/ stearyl caprate (25/25) | 1,1-bis-(4-hydroxy-phenyl)-n-dodecane (12) | 2-(3-t-butyl-5-methyl-2-hydroxyphenyl)-5-chloro-benzotriazole/ bis(1,2,2,6,6-pentamethyl-4-piperidyl) sebacate (5/1) | black ←→ colorless (30° C.) |

TABLE 7

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 8 | 3-(2-ethoxy-4-N-ethyl-anilino)-3-(1-ethyl-2-methylindol-3-yl)-4-azaphthalide (2) | 4,4'-methylene-bisphenol (2) | neopentyl stearate (50) | 1,1-bis-(4-hydroxy-phenyl)-n-octane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorless (14° C.    33° C.) |

TABLE 7-continued

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 9 | 3-(2-ethoxy-4-N-ethyl-anilino)-3-(1-ethyl-2-methylindol-3-yl)-4-azaphthalide (2) | 4,4'-methylene-bisphenol (2) | neopentyl stearate (50) | 1,1-bis-(4-hydroxy-phenyl)-n-decane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorless (14° C.   33° C.) |
| 10 | 3-(2-ethoxy-4-N-ethyl-anilino)-3-(1-ethyl-2-methylindol-3-yl)-4-azaphthalide (2) | 4,4'-methylene-bisphenol (2) | neopentyl stearate (50) | 1,1-bis-(4-hydroxy-phenyl)-n-dodecane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorless (14° C.   33° C.) |
| 11 | 3-(2-ethoxy-4-N-ethyl-anilino)-3-(1-ethyl-2-methylindol-3-yl)-4-azaphthalide (2) | — | neopentyl stearate (50) | 1,1-bis-(4-hydroxy-phenyl)-n-octane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorless (14° C.   33° C.) |
| 12 | 3-(2-ethoxy-4-N-ethyl-anilino)-3-(1-ethyl-2-methylindol-3-yl)-4-azaphthalide (2) | — | neopentyl stearate (50) | 1,1-bis-(4-hydroxy-phenyl)-n-decane (6) | 2-(3-t-butyl 5-methyl-2-hydroxyphen-yl)-5-chloro-benzotriazole/ bis(1,2,2,6,6-pentamethyl-4-piperidyl) sebacate (3/1) | blue ←→ colorless (14° C.   33° C.) |

TABLE 8

| Composition No. | Component (a) Electron donating, color forming Organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 13 | 3-(2-ethoxy-4-N-ethyl-anilino)-3-(1-ethyl-2-methylindol-3-yl)-4-azaphthalide (2) | — | neopentyl stearate (50) | 1,1-bis-(4-hydroxy-phenyl)-n-dodecane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorles (14° C.   30° C.) |
| 14 | 3-(2-ethoxy-4-N-ethyl-anilino)-3-(1-ethyl-2-methylindol-3-yl)-4-azaphthalide (2) | — | neopentyl stearate (50) | 1,1-bis-(4-hydroxy-phenyl)-n-tetradecane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorles (14° C.   30° C.) |

TABLE 8-continued

| Composition No. | Component (a) Electron donating, color forming Organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 15 | 3-(2-ethoxy-4-N-ethyl-anilino)-3-(1-ethyl-2-methylindol-3-yl)-4-azaphthalide (2) | — | neopentyl stearate (50) | 1,1-bis-(4-hydroxy-phenyl)-n-hexadecane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorles (14° C.   30° C.) |
| 16 | 3-(2-ethoxy-4-N-ethyl-anilino)-3-(1-ethyl-2-methylindol-3-yl)-4-azaphthalide (2) | — | neopentyl stearate (50) | 1,1-bis-(3-methyl-4-hydroxy-phenyl)-n-decane (6) | 2-(3-t-butyl-5-methyl-2-hydroxyphen-yl)-5-chloro-benzotriazole/ bis(1,2,2,6,6-pentamethyl-4-piperidyl) sebacate (3/1) | blue ←→ colorles (14° C.   30° C.) |

TABLE 9

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 17 | 3-(2-ethoxy-4-diethyl-aminophenyl)-3-(1-ethyl-2-methylindol-3-yl)-4-azaphthalide (0.5) | — | 8-penta-decane (50) | 1,1-bis-(4-hydroxy-phenyl)-n-ethylhexane (6) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | dark blue ←→ colorless (7° C.   29° C.) |
| 18 | 3-(2-ethoxy-4-diethyl-aminophenyl)-3-(1-ethyl-2-methylindol-3-yl)-4-azaphthalide (0.5) | — | 8-penta-decane (50) | 1,1-bis-(4-hydroxy-phenyl)-n-ethylhexane (10) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | dark blue ←→ colorless (7° C.   29° C.) |
| 19 | 3-(2-ethoxy-4-diethyl-aminophenyl)-3-(1-ethyl-2-methylindol-3-yl)-4-azaphthalide (0.5) | — | 8-penta-decane (50) | 1,1-bis-(4-hydroxy-phenyl)-n-ethylhexane (15) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | dark blue ←→ colorless (7° C.   29° C.) |
| 20 | 2-(N-methyl-anilino)-6- | — | neopentyl stearate | 1,1-bis-(4-hydroxy- | 2-(3-t-butyl-5-methyl-2- | dark green ←→ colorless (14° C.   30° C.) |

TABLE 9-continued

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| | (N-ethyl-N-p-tolylamino) fluoran (4) | | (50) dodecane | phenyl)-n- (6) | hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | |
| 21 | 3,3-bis(1-n-butyl-2-methyl-indol-3-yl) phthalide (2) | — | neopentyl stearate (50) dodecane | 1,1-bis-(4-hydroxy-phenyl)-n- (6) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | purplish red ←→ colorless (14° C.    30° C.) |

TABLE 10

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 22 | 2-(2-octoxy-phenyl)-4-(4-dimethyl-aminophenyl)-6-phenyl-pyridine (3) | — | neopentyl stearate (50) | 1,1-bis-(4-hydroxy-phenyl)-n-dodcane (10) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | yellow ←→ colorless (14° C.    30° C.) |
| 23 | 1,3-dimethyl-6-diethyl-aminofluoran (2) | — | neopentyl stearate (50) | 1,1-bis-(4-hydroxy-phenyl)-n-dodcane (6) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | orange ←→ colorless (14° C.    30° C.) |
| 24 | 2-chloro-3-methyl-6-diethyl-aminofluoran (2) | — | neopentyl stearate (50) | 1,1-bis-(4-hydroxy-phenyl)-n-dodcane (6) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n- | vermilion ←→ colorless (10° C.    29° C.) |

TABLE 10-continued

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 25 | 1,2-benz-6-(N-ethyl-N-isobutyl-amino)fluoran (2) | — | neopentyl stearate (50) | 1,1-bis-(4-hydroxy-phenyl)-n-dodcane (6) | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | pink ←→ colorless (14° C.    30° C.) |

TABLE 11

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 26 | 3,3-bis-(2-ethoxy-4-diethylamino-phenyl)-4-azaphthalide (1.5) | 2,2-bis-(4-hydroxyphen-yl)-propane (8) | cetyl caprate/ decyl myristate (40/10) | — | 2-(3-t-butyl-5-methyl-2-hydroxyphen-yl)-5-chloro-benzotriazole (5) | bluish green ←→ colorless (20° C.) |
| 27 | 2-(2-chloro-anilino)-6-di-n-butyl-aminofluoran (4) | 1,1-bis-(4-hydroxyphen-yl)-ethane (12) | hexadecyl alcohol/ stearyl caprate (25/25) | — | 2-(3-t-butyl-5-methyl-2-hydroxyphenyl)-5-chloro-benzotriazole/ bis(1,2,2,6,6-pentamethyl-4-piperidyl) sebacate (5/1) | black ←→ colorless (30° C.) |
| 28 | 3-(2-ethoxy-4-N-ethyl-anilino)-3-(1-ethyl-2-methylindol-3-yl)-4-azaphthalide (2) | 4,4'-methylene-bisphenol (8) | neopentyl stearate (50) | — | 2-(3-t-butyl-5-methyl-2-hydroxyphenyl)-5-chloro-benzotriazole/ bis(1,2,2,6,6-pentamethyl-4-piperidyl) sebacate (5/1) | blue ←→ colorless (14° C.    33° C.) |

TABLE 12

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 29 | 3-(2-ethoxy-4-diethyl-aminophenyl)-3-(2-ethyl-2-methylindol-3-yl)-4-azaphthalide (0.5) | 2,2-bis-(4-hydroxy-phenyl)-propane (6) | 8-penta-decane (50) | — | 2-(3-t-butyl-5-methyl-2-hydroxyphen-yl)-5-chloro-benzotriazole/ bis-(1,2,2,6,6-pentamethyl-4-piperidyl) 2-(3,5-di-t- | dark blue ←→ colorless (7° C.    29° C.) |

TABLE 12-continued

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 30 | 2-(N-methyl-anilino)-6-(N-ethyl-N-p-tolylamino) fluoran (4) | 2,2-bis-(4-hydroxy-phenyl)-propane (6) | neopentyl stearate (50) | — | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | dark green ←→ colorless (14° C.    33° C.) |
| 31 | 3,3-bis(1-n-butyl-2-methyl-indol-3-yl) phthalide (2) | 2,2-bis-(4-hydroxy-phenyl)-propane (6) | neopentyl stearate (50) | — | 2-(3-t-butyl-5-methyl-2-hydroxyphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | purplish red ←→ colorless (14° C.    33° C.) |

TABLE 13

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 32 | 2-(2-octoxy-phenyl)-4-(4-dimethyl-aminophenyl)-6-phenyl-pyridine (3) | 2,2-bis-(4-hydroxy-phenyl)-propane (10) | neopentyl stearate (50) | — | 2-(3-t-butyl-5-methyl-2-hydroyxphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | yellow ←→ colorless (14° C.    33° C.) |
| 33 | 1,3-dimethyl-6-diethyl-aminofluoran (2) | 2,2-bis-(4-hydroxy-phenyl)-propane (6) | neopentyl stearate (50) | — | 2-(3-t-butyl-5-methyl-2-hydroyxphen-yl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | orange ←→ colorless (14° C.    33° C.) |
| 34 | 2-chloro-3-methyl-6-diethyl-aminofluoran (2) | 2,2-bis-(4-hydroxy-phenyl)-propane (6) | neopentyl stearate (50) | — | 2-(3-t-butyl-5-methyl-2-hydroyxphen-yl)-5-chloro-benzotriazole/ | vermilion ←→ colorless (14° C.    33° C.) |

TABLE 13-continued

| Composition No. | Component (a) Electron donating, color forming organic comp. | Component (b) Electron accepting organic comp. | Component (c) Metachromatic temperature adjuster | Component (d) Light-fastness providing agent | Component (e) Light-stabilizer | Color variation Develpd. ←→ Extingd. Metachromatic temperature |
|---|---|---|---|---|---|---|
| 35 | 1,2-benz-6-(N-ethyl-N-isobutyl-amino)fluoran (2) | 2,2-bis-(4-hydroxy-phenyl)-propane (6) | neopentyl stearate (50) | — | bis-(1,2,2,6,6-pentamethyl-4-piperidyl) 2-(3,5-di-t-butyl-4-hydroxy-benzyl)-2-n-butylmalonate (3/1) 2-(3-t-butyl-5-methyl-2-hydroyxphenyl)-5-chloro-benzotriazole/ bis-(1,2,2,6,6-pentamethyl-4-piperidyl) 2-(3,5-di-t-butyl-4-hydroxy-benzyl)-2-n-butylmalonate (3/1) | pink ←→ colorless (14° C.    33° C.) |

TABLE 14

| Example No. | Composition No. | Type of light = fastness test | State of light = fastness test sample | Carbon arc lamp light-fastness test results (coloring density retention) Exposure time | | | | | |
|---|---|---|---|---|---|---|---|---|---|
| | | | | None | 10 hrs | 20 hrs | 30 hrs | 40 hrs | 50 hrs |
| 1 | 1 | 1 | Color = extinguished state | 100% | 94% | 88% | 79% | 70% | 60% |
| 2 | 2 | 1 | Color = extinguished state | 100% | 95% | 90% | 86% | 78% | 68% |
| 3 | 3 | 1 | Color = extinguished state | 100% | 98% | 95% | 90% | 85% | 75% |
| 4 | 8 | 1 | Color = extinguished state | 100% | 95% | 92% | 87% | 82% | 76% |
| 5 | 9 | 1 | Color = extinguished state | 100% | 97% | 94% | 91% | 88% | 78% |
| 6 | 10 | 1 | Color = extinguished state | 100% | 98% | 96% | 93% | 90% | 80% |
| 7 | 11 | 1 | Color = extinguished state | 100% | 98% | 94% | 87% | 83% | 77% |
| 8 | 12 | 1 | Color = extinguished state | 100% | 99% | 97% | 90% | 84% | 80% |
| 9 | 13 | 1 | Color = extinguished state | 100% | 100% | 99% | 96% | 92% | 88% |
| 10 | 14 | 1 | Color = extinguished state | 100% | 100% | 98% | 95% | 90% | 87% |
| 11 | 15 | 1 | Color = extinguished state | 100% | 97% | 92% | 88% | 82% | 74% |
| 12 | 16 | 1 | Color = extinguished state | 100% | 98% | 97% | 92% | 86% | 83% |
| 13 | 17 | 1 | Color = extinguished state | 100% | 98% | 95% | 92% | 88% | 81% |

TABLE 14-continued

| Example No. | Composition No. | Type of light-fastness test | State of light-fastness test sample | Carbon arc lamp light-fastness test results (coloring density retention) Exposure time | | | | | |
|---|---|---|---|---|---|---|---|---|---|
| | | | | None | 10 hrs | 20 hrs | 30 hrs | 40 hrs | 50 hrs |
| 14 | 18 | 1 | Color-extinguished state | 100% | 98% | 96% | 94% | 91% | 87% |
| 15 | 19 | 1 | Color-extinguished state | 100% | 99% | 98% | 95% | 92% | 89% |
| Comparative Example: | | | | | | | | | |
| 1 | 26 | 1 | Color-extinguished state | 100% | 97% | 88% | 68% | 51% | 35% |
| 2 | 28 | 1 | Color-extinguished state | 100% | 94% | 85% | 72% | 60% | 51% |
| 3 | 29 | 1 | Color-extinguished state | 100% | 95% | 91% | 74% | 62% | 53% |

TABLE 15

| Example No. | Composition No. | Test type | State of light-fastness test sample | Light stabilizer in light-stabilizer layer | Carbon arc lamp light-fastness test results (coloring density retention) Exposure time | | | | | |
|---|---|---|---|---|---|---|---|---|---|---|
| | | | | | None | 40 hrs | 60 hrs | 80 hrs | 100 hrs | 120 hrs |
| 16 | 1 | 2 | Color-extinguished state | 2-(3,5-di-t-amyl-2-hydroxyphenyl)-benzotriazole (3.5) | 100% | 96% | 90% | 79% | 71% | 60% |
| 17 | 2 | 2 | Color-extinguished state | 2-(3,5-di-t-amyl-2-hydroxyphenyl)-benzotriazole (3.5) | 100% | 98% | 93% | 86% | 76% | 68% |
| 18 | 3 | 2 | Color-extinguished state | 2-(3,5-di-t-amyl-2-hydroxyphenyl)-benzotriazole (3.5) | 100% | 100% | 99% | 89% | 80% | 70% |
| 19 | 4 | 2 | Color-extinguished state | 2-(3,5-di-t-amyl-2-hydroxyphenyl)-benzotriazole (3.5) | 100% | 98% | 96% | 95% | 92% | 82% |
| 20 | 5 | 2 | Color-extinguished state | 2-(3,5-di-t-amyl-2-hydroxyphenyl)-benzotriazole (3.5) | 100% | 98% | 97% | 96% | 94% | 85% |
| 21 | 6 | 2 | Color-extinguished state | 2-(3,5-di-t-amyl-2-hydroxyphenyl)-benzotriazole (3.5) | 100% | 100% | 99% | 97% | 95% | 88% |
| 22 | 7 | 2 | Color-extinguished state | 2-(3,5-di-t-amyl-2-hydroxyphenyl)-benzotriazole (3.5) | 100% | 100% | 99% | 99% | 97% | 90% |
| 23 | 8 | 2 | Color-extinguished state | 2-(3,5-di-t-amyl-2-hydroxyphenyl)-benzotriazole (3.5) | 100% | 96% | 92% | 86% | 82% | 75% |
| 24 | 9 | 2 | Color-extinguished state | 2-(3,5-di-t-amyl-2-hydroxyphenyl)-benzotriazole (3.5) | 100% | 97% | 94% | 90% | 88% | 81% |
| 25 | 10 | 2 | Color-extinguished state | 2-(3,5-di-t-amyl-2-hydroxyphenyl)-benzotriazole (3.5) | 100% | 98% | 96% | 92% | 89% | 83% |
| 26 | 11 | 2 | Color-extinguished state | 2-(3,5-di-t-amyl-2-hydroxyphenyl)-benzotriazole (3.5) | 100% | 99% | 96% | 93% | 89% | 85% |

TABLE 15-continued

| Example No. | Composition No. | Test type | State of light=fastness test sample | Light stabilizer in light=stabilizer layer | Carbon arc lamp light-fastness test results (coloring density retention) Exposure time | | | | | |
|---|---|---|---|---|---|---|---|---|---|---|
| | | | | | None | 40 hrs | 60 hrs | 80 hrs | 100 hrs | 120 hrs |
| 27 | 12 | 2 | Color ≦ extinguished state | 2-(3,5-di-t-amyl-2-hydroxyphenyl)-benzotriazole (3.5) | 100% | 100% | 99% | 97% | 95% | 92% |

TABLE 16

| Example No. | Composition No. | Test type | State of light=fastness test sample | Light stabilizer in light=stabilizer layer | Carbon arc lamp light-fastness test results (coloring density retention) Exposure time | | | | | |
|---|---|---|---|---|---|---|---|---|---|---|
| | | | | | None | 40 hrs | 60 hrs | 80 hrs | 100 hrs | 120 hrs |
| 28 | 13 | 2 | Color = extinguished state | 2-(3,5-di-t-amyl-2-hydroxyphenyl)-benzotriazole (3.5) | 100% | 100% | 100% | 99% | 97% | 95% |
| 29 | 14 | 2 | Color = extinguished state | 2-(3,5-di-t-amyl-2-hydroxyphenyl)-benzotriazole (3.5) | 100% | 100% | 98% | 97% | 95% | 93% |
| 30 | 15 | 2 | Color = extinguished state | 2-(3,5-di-t-amyl-2-hydroxyphenyl)-benzotriazole (3.5) | 100% | 98% | 95% | 93% | 90% | 86% |
| 31 | 16 | 2 | Color = extinguished state | 2-(3,5-di-t-amyl-2-hydroxyphenyl)-benzotriazole (3.5) | 100% | 100% | 98% | 97% | 96% | 93% |
| 32 | 17 | 2 | Color = extinguished state | 2-(3-t-butyl-5-octyloxycarbonyl-ethyl-2-hydroxyphenyl)-benzotriazole (5.0) | 100% | 95% | 91% | 87% | 85% | 82% |
| 33 | 18 | 2 | Color = extinguished state | 2-(3-t-butyl-5-octyloxycarbonyl-ethyl-2-hydroxyphenyl)-benzotriazole (5.0) | 100% | 97% | 94% | 91% | 88% | 86% |
| 34 | 19 | 2 | Color = extinguished state | 2-(3-t-butyl-5-octyloxycarbonyl-ethyl-2-hydroxyphenyl)-benzotriazole (5.0) | 100% | 99% | 98% | 94% | 92% | 90% |
| 35 | 20 | 2 | Color = extinguished state | 2-(3-t-butyl-5-octyloxycarbonyl-ethyl-2-hydroxyphenyl)-benzotriazole (5.0) | 100% | 99% | 96% | 91% | 85% | 79% |
| 36 | 21 | 2 | Color = extinguished state | 2-(3-t-butyl-5-octyloxycarbonyl-ethyl-2-hydroxyphenyl)-benzotriazole (5.0) | 100% | 90% | 82% | 78% | 71% | 65% |
| 37 | 22 | 2 | Color = extinguished state | 2-(3-t-butyl-5-octyloxycarbonyl-ethyl-2-hydroxyphenyl)-benzotriazole (5.0) | 100% | 88% | 80% | 75% | 70% | 62% |

TABLE 17

| Example No. | Composition No. | Test type | State of light-fastness test sample | Light stabilizer in light-stabilizer layer | Carbon arc lamp light-fastness test results (coloring density retention) Exposure time | | | | | |
|---|---|---|---|---|---|---|---|---|---|---|
| | | | | | None | 40 hrs | 60 hrs | 80 hrs | 100 hrs | 120 hrs |
| Comparative Example: | | | | | | | | | | |
| 4 | 26 | 2 | Color = extinguished state | 2-(3,5-di-t-amyl-2-hydroxyphenyl)-benzotriazole (3.5) | 100% | 96% | 82% | 60% | 52% | 40% |
| 5 | 27 | 2 | Color = extinguished state | 2-(3,5-di-t-amyl-2-hydroxyphenyl)-benzotriazole (3.5) | 100% | 97% | 95% | 90% | 84% | 76% |
| 6 | 28 | 2 | Color = extinguished state | 2-(3,5-di-t-amyl-2-hydroxyphenyl)-benzotriazole (3.5) | 100% | 96% | 92% | 69% | 37% | 25% |
| 7 | 29 | 2 | Color = extinguished state | 2-(3,5-di-t-amyl-2-hydroxyphenyl)-benzotriazole (3.5) | 100% | 97% | 85% | 70% | 35% | 20% |
| 8 | 30 | 2 | Color = extinguished state | 2-(3,5-di-t-amyl-2-hydroxyphenyl)-benzotriazole (3.5) | 100% | 96% | 93% | 87% | 74% | 60% |
| 9 | 31 | 2 | Color = extinguished state | 2-(3,5-di-t-amyl-2-hydroxyphenyl)-benzotriazole (3.5) | 100% | 88% | 75% | 60% | 40% | 30% |
| 10 | 32 | 2 | Color = extinguished state | 2-(3,5-di-t-amyl-2-hydroxyphenyl)-benzotriazole (3.5) | 100% | 85% | 73% | 64% | 55% | 45% |

TABLE 18

| Example No. | Composition No. | Test type | State of light-fastness test sample | Light stabilizer in light-stabilizer layer | Carbon arc lamp light-fastness test results (coloring density retention) Exposure time | | | | | |
|---|---|---|---|---|---|---|---|---|---|---|
| | | | | | None | 40 hrs | 60 hrs | 80 hrs | 100 hrs | 120 hrs |
| 38 | 23 | 2 | Color = extinguished state | 2-(3-t-butyl-5-octyloxycarbonyl-ethyl-2-hydroxyphenyl)-benzotriazole (5.0) | 100% | 100% | 98% | 95% | 94% | 93% |
| 39 | 24 | 2 | Color = extinguished state | 2-(3-t-butyl-5-octyloxycarbonyl-ethyl-2-hydroxyphenyl)-benzotriazole (5.0) | 100% | 100% | 99% | 98% | 97% | 97% |
| 40 | 25 | 2 | Color = extinguished state | 2-(3-t-butyl-5-octyloxycarbonyl-ethyl-2-hydroxyphenyl)-benzotriazole (5.0) | 100% | 99% | 98% | 97% | 96% | 95% |
| Comparative Example: | | | | | | | | | | |
| 11 | 33 | 2 | Color = extinguished state | 2-(3-t-butyl-5-octyloxycarbonyl-ethyl-2-hydroxyphenyl)-benzotriazole (5.0) | 100% | 98% | 95% | 89% | 82% | 76% |
| 12 | 34 | 2 | Color = extinguished state | 2-(3-t-butyl-5-octyloxycarbonyl-ethyl-2-hydroxyphenyl)-benzotriazole (5.0) | 100% | 98% | 96% | 91% | 85% | 77% |
| 13 | 35 | 2 | Color = extinguished state | 2-(3-t-butyl-5-octyloxycarbonyl-ethyl-2-hydroxyphenyl)-benzotriazole (5.0) | 100% | 97% | 95% | 90% | 86% | 75% |

TABLE 19(A)

| Example No. | Type of Composition No. | State of light-fastness test | light-fastness test sample | Joint layer Light-screening pigment | Light stabilizer | Light stabilizer in light-stabilizer layer |
|---|---|---|---|---|---|---|
| 41 | 1 | 3 | Color = extinguished state | IRIODIN-235 (10) | 2-(5-t-butyl-2-hydroxyphenyl)-benzotriazole (5) | 2,2'-dihydroxy-4,4'-dimethoxy-benzotriazole (3.5) |
| 42 | 2 | 3 | Color = extinguished state | IRIODIN-235 (10) | 2-(5-t-butyl-2-hydroxyphenyl)-benzotriazole (5) | 2,2'-dihydroxy-4,4'-dimethoxy-benzotriazole (3.5) |
| 43 | 3 | 3 | Color = extinguished state | IRIODIN-235 (10) | 2-(5-t-butyl-2-hydroxyphenyl)-benzotriazole (5) | 2,2'-dihydroxy-4,4'-dimethoxy-benzotriazole (3.5) |
| Comparative Example: | | | | | | |
| 14 | 26 | 3 | Color = extinguished state | IRIODIN-235 (10) | 2-(5-t-butyl-2-hydroxyphenyl)-benzotriazole (5) | 2,2'-dihydroxy-4,4'-dimethoxy-benzotriazole (3.5) |

TABLE 19(B)

| Example No. | Carbon arc lamp light-fastness test results (coloring density retention) Exposure time | | | | | | |
|---|---|---|---|---|---|---|---|
| | None | 40 hrs | 60 hrs | 80 hrs | 100 hrs | 120 hrs | 140 hrs |
| 41 | 100% | 98% | 96% | 93% | 90% | 80% | 70% |
| 42 | 100% | 100% | 99% | 94% | 92% | 85% | 81% |
| 43 | 100% | 100% | 100% | 100% | 95% | 90% | 85% |
| Comparative Example: | | | | | | | |
| 14 | 100% | 98% | 96% | 89% | 78% | 66% | 55% |

TABLE 20(A)

| Example No. | Type of Composition No. | State of light-fastness test | light-fastness test sample | Joint layer Light-screening pigment | Light stabilizer | Light stabilizer in light-stabilizer layer |
|---|---|---|---|---|---|---|
| 44 | 8 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 45 | 9 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 46 | 10 | 3 | Color = extinguished state | IRIODIN-225 (10) | 2-(3-t-butyl-5-octyloxycarbonyl-ethyl-2- | 2-(3,5-di-t-amyl-2-hydroxyphenyl)-benzotriazole |

TABLE 20(A)-continued

| Example No. | Composition No. | Type of light-fastness test | State of light-fastness test sample | Joint layer Light = screening pigment | Light stabilizer | Light stabilizer in light = stabilizer layer |
|---|---|---|---|---|---|---|
| | | | | | hydroxyphenyl benzotriazole (5) | (3.5) |
| 47 | 11 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 48 | 12 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 49 | 13 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 50 | 14 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 51 | 15 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| 52 | 16 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |
| Comparative Example: | | | | | | |
| 15 | 28 | 3 | Color = extinguished state | IRIODIN-225 (10) | 2-(3-t-butyl-5-octyloxycarbonyl-ethyl-2-hydroxyphenyl benzotriazole (5) | 2-(3,5-di-t-amyl-2-hydroxyphenyl)-benzotriazole (3.5) |

TABLE 20(B)

| Example No. | Carbon arc lamp light-fastness test results (coloring density retention) Exposure time | | | | | | |
|---|---|---|---|---|---|---|---|
| | None | 80 hrs | 100 hrs | 120 hrs | 140 hrs | 160 hrs | 180 hrs |
| 44 | 100% | 94% | 91% | 86% | 80% | 74% | 68% |
| 45 | 100% | 100% | 98% | 92% | 84% | 79% | 75% |
| 46 | 100% | 100% | 100% | 97% | 96% | 93% | 91% |
| 47 | 100% | 100% | 98% | 95% | 93% | 91% | 86% |
| 48 | 100% | 100% | 100% | 98% | 97% | 95% | 92% |
| 49 | 100% | 100% | 100% | 100% | 99% | 97% | 95% |
| 50 | 100% | 100% | 100% | 99% | 95% | 92% | 90% |
| 51 | 100% | 98% | 95% | 93% | 90% | 87% | 83% |
| 52 | 100% | 100% | 100% | 96% | 95% | 92% | 90% |
| Comparative Example: | | | | | | | |
| 15 | 100% | 95% | 87% | 72% | 52% | 43% | 35% |

What is claimed is:

1. A reversible thermochromic composition comprising a composition formed by blending:
   (a) an electron donating compound;
   (b) an electron accepting compound;
   (c) a metachromatic temperature adjuster;
   (d) 0.3–70 parts by weight of an electron accepting, light-fastness providing agent represented by Formula I based on 1.0 part by weight of the component-(a) electron donating compound:

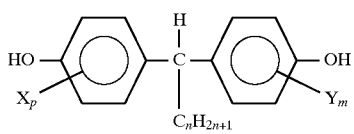

wherein n represents an integer of 5 to 17 to form a straight-chain or branched alkyl group; X and Y independently represent a straight-chain or branched alkyl group having 1 to 4 carbon atoms, or a halogen atom; and p and m independently represent an integer of 0 to 3; and (e) a light stabilizer.

2. The reversible thermochromic composition according to claim 1, which is enclosed in microcapsules.

3. The reversible thermochromic composition according to claim 1, which is dispersed in a resin binder.

4. A reversible thermochromic composition comprising a composition formed by blending:

(a) an electron donating compound;

(b) 0.3–70 parts by weight of an electron accepting compound based on 1.0 part by weight of the component-(a) electron donating compound; and (c) a metachromatic temperature adjuster, said electron accepting compound being a light-fastness providing agent represented by Formula I:

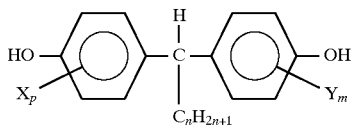

wherein n represents an integer of 5 to 17 to form a straight-chain or branched alkyl group; X and Y independently represent a straight-chain or branched alkyl group having 1 to 4 carbon atoms, or a halogen atom; and p and m independently represent an integer of 0 to 3 and (d) a light stabilizer.

5. The reversible thermochromic composition according to claim 4, wherein the components (a) through (c) and (e) are enclosed in microcapsules.

6. The reversible thermochromic composition according to claim 4, wherein the components (a) through (c) and (e) are dispersed in a resin binder.

7. A reversible thermochromic composition comprising the following components (a)–(d):

(a) an electron donating compound;

(b) a metachromatic temperature adjuster;

(c) a compound according to the following Formula I:

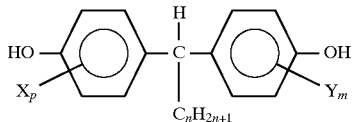

wherein n represents an integer of 5 to 17; X and Y independently represent a straight-chain or branched alkyl group having 1 to 4 carbon atoms, or a halogen atom; and p and m independently represent an integer of 0 to 3; and (d) a light stabilizer, wherein said compound according to Formula I is contained in an amount of 0.3 to 70 parts by weight based on 1.0 part by weight of said electron donating compound.

8. The composition according to claim 7, further comprising an electron accepting compound.

9. The composition according to claim 7, which is enclosed in microcapsules.

10. The composition according to claim 8, which is enclosed in microcapsules.

11. The composition according to claim 7, which is dispersed in a resin binder.

12. The composition according to claim 7, wherein said compound according to Formula I is contained in an amount of 1 to 60 parts by weight based on 1.0 part by weight of said electron donating compound.

13. The composition according to claim 12, wherein the components (a), (b), (c) and (d) are enclosed in microcapsules.

14. The composition according to claim 12, wherein the components (a), (b), (c) and (d) and the second electron accepting compound are dispersed in a resin.

15. A metachromic layer, comprising the reversible thermochromic composition according to claim 7 and at least one of an additional light stabilizer and a metallic luster pigment.

16. The layer according to claim 15, wherein the components (a) through (d) and said additional light stabilizer or metallic luster pigment are enclosed in microcapsules.

17. The layer according to claim 15 or 16, wherein said reversible thermochromic composition is formed by blending (i) a composition prepared by dispersing the components (a) to (d) in a resin binder with (ii) a dispersion of said at least one of the light stabilizer and the metallic luster pigment in a second binder resin.

18. A method of causing metachromatism comprising the steps of:

selecting the reversible thermochromic composition according to any of claims 7–13; and changing a temperature of said composition.

19. A method of causing metachromatism comprising the steps of:

selecting the metachromic layer according to claim 15 or 16; and changing a temperature of said layer.

20. A method of causing metachromatism comprising the steps of:

selecting the metachromic layer according to claim 17; and changing a temperature of said layer.

* * * * *

UNITED STATES PATENT AND TRADEMARK OFFICE
CERTIFICATE OF CORRECTION

PATENT NO. : 5,879,438

DATED : March 9, 1999

INVENTOR(S) : KATSUYUKI FUJITA ET AL.

It is certified that error appears in the above-identified patent and that said Letters Patent is hereby corrected as shown below:

ON THE TITLE PAGE [73]

Assignee, "Aichi-ken" should read --Nagoya--.

[56] REFERENCES CITED

U.S. PATENT DOCUMENTS, "Sumi et al." should read --Sumii et al.--.

COLUMN 1

Line 9, "of degradation of color to" should read --to degradation of color by--.

COLUMN 3

Line 21, "differs" should read --differs from--; and
    Line 22, "from" should be deleted.

COLUMN 4

Line 13, "color- extinguished" should read --color-extinguished--;
    Line 25, "can not" should read --cannot--;
    Line 37, "substitute" should read --substituent--;
    Line 43, "can not" should read --cannot--; and
    Line 62, "group" should read --groups--.

UNITED STATES PATENT AND TRADEMARK OFFICE
CERTIFICATE OF CORRECTION

PATENT NO.   :   5,879,438
DATED        :   March 9, 1999
INVENTOR(S)  :   KATSUYUKI FUJITA ET AL.

It is certified that error appears in the above-identified patent and that said Letters Patent is hereby corrected as shown below:

COLUMN 9

Line 32, "diestrers" should read --diesters--;
Line 33, "diestrers" should read --diesters--; and
Line 43, "Metals" should read --Metal--.

COLUMN 11

Line 13, "dillaurate" should read --dilaurate--.

COLUMN 12

Line 34, "linorate," (both occurrences) should read --linolate--.

COLUMN 16

Line 29, "dimenthylbenzyl" should read --dimethylbenzyl--.

COLUMN 18

Line 67, "70 nm" should read --700 nm--.

COLUMN 20

Line 36, "hexachlroantimonate" should read --hexachloroantimonate--;
Line 51, "hexachlroantimonate" should read --hexachloroantimonate--; and
Line 66, "hexachlroantimonate" should read --hexachloroantimonate--.

UNITED STATES PATENT AND TRADEMARK OFFICE
CERTIFICATE OF CORRECTION

PATENT NO. : 5,879,438

DATED : March 9, 1999

INVENTOR(S) : KATSUYUKI FUJITA ET AL.

It is certified that error appears in the above-identified patent and that said Letters Patent is hereby corrected as shown below:

COLUMN 21

Line 45, "forth." should read --forth may be used.--; and
    Line 64, "120" should read --120°C--.

COLUMN 22

Line 14, "blusish" should read --bluish--; and
    Line 56, "provoding" should read --providing--.

COLUMN 23

Line 58, "spray-  coated" should read --spray-coated--.

COLUMN 33

Table 10, No. 22, "dodcane" should read --dodecane--;
    Table 10, No. 23, "dodcane" should read --dodecane--;
    Table 10, No. 24, "dodcane" should read --dodecane--;

COLUMN 35

Table 10, No. 25, "dodcane" should read --dodecane--;
    Table 12, No. 29, "3-(2-ethyl-2-" should read --3-(1-ethyl-2- --.

COLUMN 43

Table 15, No. 27, "Color $\leqq$" should read --Color≧ --.

UNITED STATES PATENT AND TRADEMARK OFFICE
CERTIFICATE OF CORRECTION

PATENT NO.    : 5,879,438
DATED         : March 9, 1999
INVENTOR(S)   : KATSUYUKI FUJITA ET AL.

It is certified that error appears in the above-identified patent and that said Letters Patent is hereby corrected as shown below:

COLUMN 45

Table 18, "40 hrs 60 hrs 80 hrs 100 hrs 120 hrs" should read --100 hrs 140 hrs 180 hrs 220 hrs 260 hrs--.

COLUMN 51

Line 33, "(c) and (e)" should read --(d)--; and
    Line 36, "(c) and (e)" should read --(d)--.

Signed and Sealed this

Fourth Day of January, 2000

Attest:

Attesting Officer      *Acting Commissioner of Patents and Trademarks*